(12) United States Patent
Mori et al.

(10) Patent No.: US 10,464,622 B2
(45) Date of Patent: Nov. 5, 2019

(54) HANDLEBAR LOCK SYSTEM

(71) Applicant: OMRON CORPORATION, Kyoto-shi, Kyoto (JP)

(72) Inventors: Shunji Mori, Gifu (JP); Hiroyuki Onitsuka, Kani (JP); Hiroaki Takeya, Ama-gun (JP); Ryoji Shimizu, Ichinomiya (JP); Masashi Sato, Nagoya (JP); Hideaki Kojima, Anpachi-gun (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 15/755,576

(22) PCT Filed: Jan. 10, 2017

(86) PCT No.: PCT/JP2017/000478
§ 371 (c)(1),
(2) Date: Feb. 27, 2018

(87) PCT Pub. No.: WO2017/145533
PCT Pub. Date: Aug. 31, 2017

(65) Prior Publication Data
US 2018/0354570 A1 Dec. 13, 2018

(30) Foreign Application Priority Data
Feb. 25, 2016 (JP) .................. 2016-034701

(51) Int. Cl.
*B62H 5/04* (2006.01)
*B62J 99/00* (2009.01)
*B62K 21/00* (2006.01)

(52) U.S. Cl.
CPC ............... *B62H 5/04* (2013.01); *B62J 99/00* (2013.01); *B62K 21/00* (2013.01)

(58) Field of Classification Search
None
See application file for complete search history.

(56) References Cited

U.S. PATENT DOCUMENTS

| | | | |
|---|---|---|---|
| 3,863,472 A * | 2/1975 | Klingfus | B62H 5/06 70/186 |
| 4,067,589 A * | 1/1978 | Hon | B62K 15/006 280/278 |

(Continued)

FOREIGN PATENT DOCUMENTS

| | | |
|---|---|---|
| JP | 2000-233783 A | 8/2000 |
| JP | 2006-117141 A | 5/2006 |

(Continued)

OTHER PUBLICATIONS

An English translation of the International Search Report of PCT/JP2017/000478 dated Mar. 14, 2017.
(Continued)

*Primary Examiner* — Curtis J King
(74) *Attorney, Agent, or Firm* — Metrolexis Law Group, PLLC

(57) ABSTRACT

The present invention provides a handlebar lock system which (i) can be used for a moving body whose traveling direction is changed with a handlebar and (ii) includes a handlebar locking device which makes it difficult to unlock the handlebar by a forcible method such as breaking. The handlebar lock system includes: a handlebar locking device (20); and a user interface (8) which notifies a user of an operation state of the handlebar locking device (20), which operation state includes at least a lock state of the handlebar (5). The handlebar locking device (20) is provided in a frame of a bicycle so as to be not viewable from outside of the bicycle. The control section (100) identifies the operation state, and then outputs, via a communication section (101), information indicative of the operation state thus identified.

(Continued)

A control section (8a) of the user interface (8) receives, from the handlebar locking device (20), the information indicative of the operation state. According to the information thus received, the control section (8a) notifies the user of operation information on the handlebar locking device (20).

8 Claims, 20 Drawing Sheets

(56) References Cited

U.S. PATENT DOCUMENTS

| | | | | |
|---|---|---|---|---|
| 5,124,565 | A * | 6/1992 | Yoshida | B60R 16/03 180/287 |
| 5,517,878 | A * | 5/1996 | Klein | B62K 21/16 403/371 |
| 5,701,771 | A * | 12/1997 | Bailey | B60R 25/022 70/163 |
| 5,761,157 | A * | 6/1998 | Takeda | G04B 37/1413 368/10 |
| 5,974,843 | A * | 11/1999 | Burkholder | B62H 5/06 70/185 |
| 5,992,192 | A * | 11/1999 | Tual | B62H 5/00 224/420 |
| 6,076,381 | A * | 6/2000 | Green | B62H 5/06 70/186 |
| 6,161,403 | A * | 12/2000 | Surratt | B62H 5/04 70/183 |
| 7,347,071 | B2 * | 3/2008 | Nakai | B60R 25/02126 70/186 |
| 8,193,921 | B2 * | 6/2012 | Konno | B62H 5/02 340/425.5 |
| 8,678,976 | B1 * | 3/2014 | Wilson | B60W 50/082 477/35 |
| 8,790,217 | B1 * | 7/2014 | Bowers | F16H 48/20 477/35 |
| 2004/0090307 | A1 * | 5/2004 | Konno | B60R 25/04 340/5.62 |
| 2004/0222679 | A1 * | 11/2004 | Michisaka | B62K 19/46 297/215.1 |
| 2005/0134477 | A1 * | 6/2005 | Ghabra | B60R 25/246 340/13.24 |
| 2006/0261673 | A1 * | 11/2006 | Unno | B60R 25/02113 307/10.1 |
| 2006/0261674 | A1 * | 11/2006 | Unno | B60R 25/02153 307/10.1 |
| 2006/0261675 | A1 * | 11/2006 | Unno | B60R 25/02153 307/10.2 |
| 2007/0277641 | A1 * | 12/2007 | Versey | B62K 21/12 74/551.4 |
| 2008/0236216 | A1 * | 10/2008 | Takeuchi | B60R 25/02113 70/207 |
| 2011/0125370 | A1 * | 5/2011 | Lefaure | B62H 5/06 701/41 |
| 2012/0125145 | A1 * | 5/2012 | VanderVeen | B62H 5/04 74/551.8 |
| 2012/0280468 | A1 * | 11/2012 | Garcia | B62J 6/02 280/274 |
| 2014/0210180 | A1 * | 7/2014 | Hudak | B62K 25/04 280/274 |
| 2015/0203071 | A1 * | 7/2015 | Kinoshita | B60R 25/0215 180/287 |
| 2016/0031506 | A1 * | 2/2016 | Lloyd | B62J 99/00 701/49 |
| 2016/0063782 | A1 * | 3/2016 | Yu | G07C 9/00111 340/5.61 |
| 2016/0221627 | A1 * | 8/2016 | Hines | B62H 5/20 |

FOREIGN PATENT DOCUMENTS

| | | |
|---|---|---|
| JP | 2008-273417 A | 11/2008 |
| JP | 2009-202669 A | 9/2009 |
| JP | 2009-214807 A | 9/2009 |

OTHER PUBLICATIONS

An English translation of the Written Opinion of PCT/JP2017/000478 dated Mar. 14, 2017.

* cited by examiner

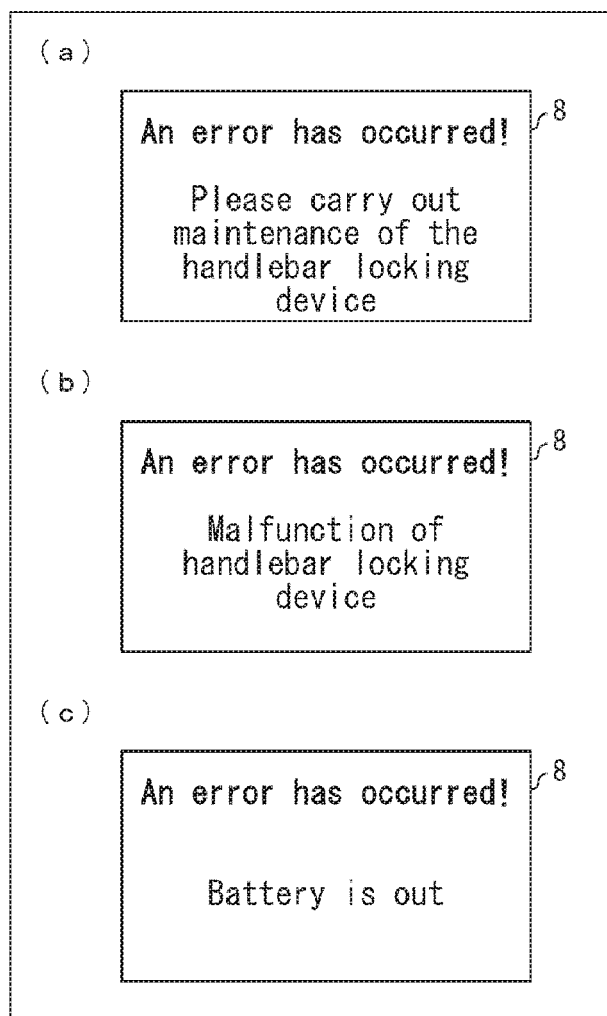

HANDLEBAR LOCK SYSTEM

TECHNICAL FIELD

The present invention relates to a handlebar lock system including a handlebar locking device which can be mounted in a moving body whose traveling direction is changed by a handlebar.

BACKGROUND ART

There are cases where a handlebar of a bicycle or the like turns by itself while the bicycle or the like is parked. If an item is placed in a basket which is attached particularly above a front wheel, then the handlebar may easily turn due to the weight of the item. This may unfortunately cause the bicycle to fall. Therefore, there have conventionally been known handlebar locking devices that restrict rotation of handlebars.

For example, Patent Literature 1 discloses a handlebar locking device which locks a handlebar by (i) attaching a bifurcated stopper piece at an upper part of a front fork of a bicycle so that the stopper piece can swing vertically and (ii) sandwiching a main frame with the stopper piece.

Patent Literature 2 discloses a handlebar locking device which locks a handlebar by pressing and fitting a handlebar fixing member, which is slidably provided, into a receiving member which is attached, against a pressure of a first spring member, to a steering column pipe of a bicycle.

Meanwhile, motorcycles and the like are conventionally configured so that, for the purpose of preventing theft, a key cannot be removed while a handlebar of a motorcycle is turned.

CITATION LIST

Patent Literature

[Patent Literature 1]
Japanese Patent Application Publication, Tokukai, No. 2009-214807 (Publication Date: Sep. 24, 2009)
[Patent Literature 2]
Japanese Patent Application Publication, Tokukai, No. 2000-233783 (Publication Date: Aug. 29, 2000).

SUMMARY OF INVENTION

Technical Problem

As in the cases of motorcycles and the like, a moving body which changes its traveling direction with a handlebar can be made difficult to steal by parking the moving body while the handlebar is locked in a turned position. Note, however, that this configuration is not limited to bicycles. Therefore, a handlebar locking device can not only prevent falling of a moving body but also serve as a lock for preventing theft.

However, according to the configuration of the handlebar locking device disclosed in each of Patent Literatures 1 and 2, the handlebar locking device itself is provided on a moving body such as a bicycle so as to be exposed. This unfortunately allows not only a user but also anybody to unlock the handlebar locking device by operating a stopper piece or handlebar fixing member. Therefore, conventional handlebar locking devices for preventing falling of a moving body cannot be used by themselves as locks for preventing theft.

It is alternatively possible that a separate lock for maintaining a lock state is provided on a handlebar locking device so that nobody except for a user possessing a key to the lock can release the lock. However, since the handlebar locking device is exposed, the lock can be relatively easily released in a case where a forcible method such as breaking the handlebar locking device is used.

The present invention has been made in view of the problem, and it is an object of the present invention to provide a handlebar lock system which (i) can be used for a moving body whose traveling direction is changed with a handlebar and (ii) includes a handlebar locking device which makes it difficult to unlock the handlebar by a forcible method such as breaking.

Solution to Problem

In order to attain the object, a handlebar lock system in accordance with an aspect of the present invention includes: a handlebar locking device which locks a handlebar of a moving body whose traveling direction is changed by the handlebar; and a state notification device which notifies a user of an operation state of the handlebar locking device, which operation state includes at least a lock state of the handlebar, the handlebar locking device including an operation state identifying section which (i) is provided in an exterior component of the moving body so as to be not viewable from outside of the moving body and (ii) identifies the operation state of the handlebar locking device and a transmitting section which outputs information indicative of the operation state identified by the operation state identifying section, and the state notification device including a receiving section which receives the information indicative of the operation state of the handlebar locking device and a notifying section which notifies, according to the information received by the receiving section, a user of operation information on the handlebar locking device.

According to the configuration, the handlebar locking device is contained and provided in the exterior component of the moving body so as to be not viewable from outside of the moving body. This makes it difficult to unlock a handlebar by a forcible method such as breaking the handlebar locking device. In addition, in a case where, while the handlebar is locked, the handlebar is turned to such an extent that it is difficult for moving body to travel straight, the handlebar locking device can be used as a lock for preventing theft.

However, according to a handlebar locking device which is provided in the exterior component of the moving body so as to be not viewable from outside of the moving body, it is not possible to visually check, from outside of the moving body, whether or not the handlebar is locked. Therefore, checking a lock state requires an operation such as actually moving the handlebar.

Hence, according to the configuration, there is provided the state notification device which notifies a user of the operation state of the handlebar locking device, which operation state includes at least the lock state of the handlebar. The operation state identifying section of the handlebar locking device identifies the operation state of the handlebar locking device, and then the transmitting section outputs information indicative of the operation state thus identified. Then, the receiving section of the state notification device receives the information. According to the information thus received, the notifying section notifies the user of operation information on the handlebar locking device.

Therefore, without carrying out an operation such as actually moving the handlebar, it is possible to check the lock state by use of the state notification device.

Advantageous Effects of Invention

An aspect of the present invention advantageously makes it possible to provide a handlebar lock system which (i) can be used for a moving body whose traveling direction is changed with a handlebar and (ii) includes a handlebar locking device which makes it difficult to unlock the handlebar by a forcible method such as breaking.

BRIEF DESCRIPTION OF DRAWINGS

FIG. 21 is a view illustrating display by which the user interface notifies the user of an error of the handlebar locking device.

DESCRIPTION OF EMBODIMENTS

The following description will discuss a handlebar lock system in accordance with an embodiment of the present invention in detail with reference to the drawings.

(Configuration of Bicycle 1)

Figure 1:
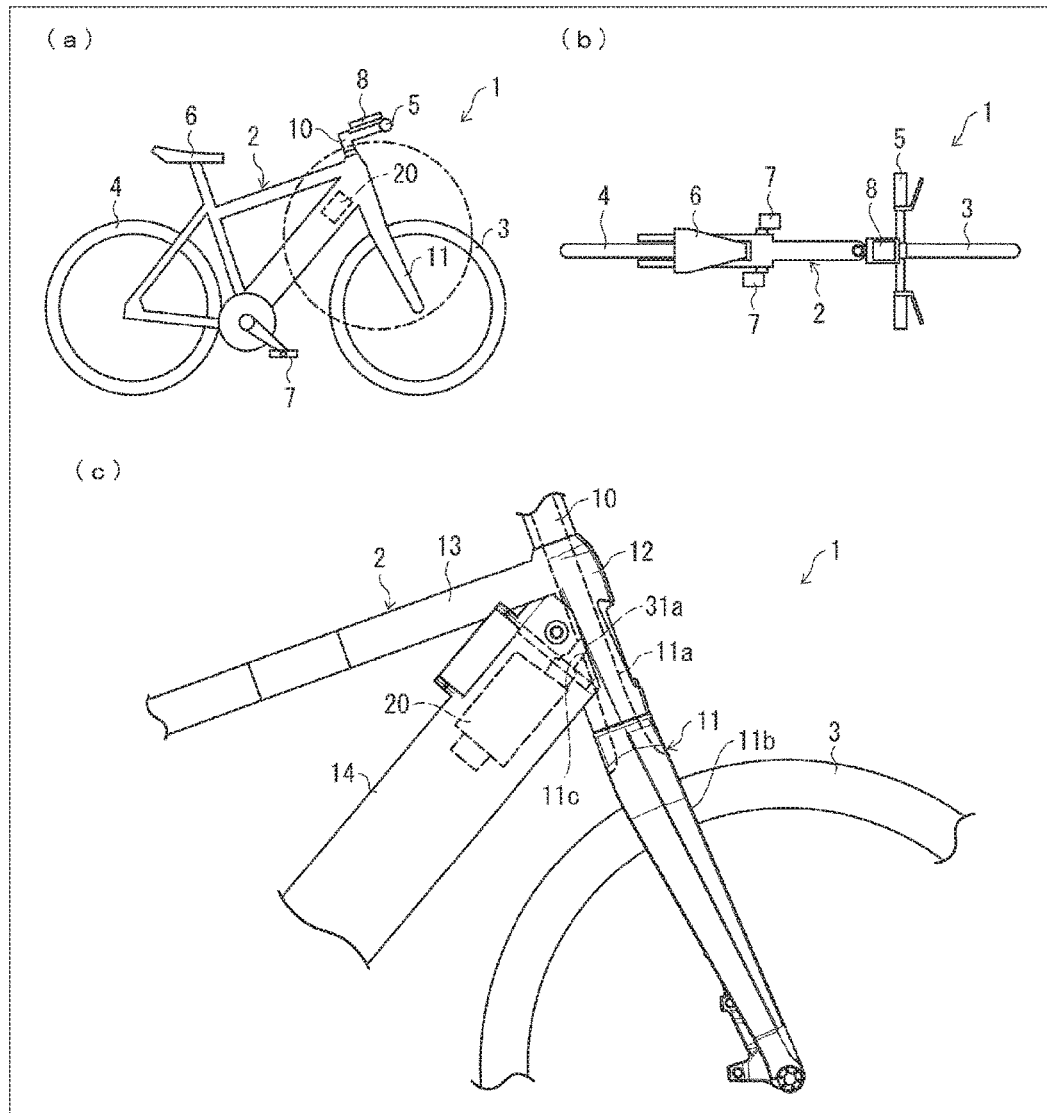
FIG. 1 is a set of views (a) through (c) showing an overview of a bicycle which is a moving body on which a handlebar locking device of a handlebar lock system in accordance with the present embodiment is mounted. (a) of FIG. 1 is a side view, (b) of FIG. 1 is a top view, and (c) of FIG. 1 is an enlarged view illustrating a front part indicated by a circle in (a) of FIG. 1.

FIG. 1 is a set of views (a) through (c) showing an overview of a bicycle 1 which is a moving body on which a handlebar locking device 20 of a handlebar lock system in accordance with the present embodiment is mounted. (a) of FIG. 1 is a side view, (b) of FIG. 1 is a top view, and (c) of FIG. 1 is an enlarged view illustrating a front part indicated by a circle in (a) of FIG. 1.

As illustrated in (a) and (b) of FIG. 1, the bicycle 1 is configured so that a front wheel 3, a rear wheel 4, a handlebar 5, a saddle 6, pedals 7, a handling system 10, a front fork 11, and the like are combined with a frame 2.

The handlebar locking device 20 is contained in the frame 2, so that the handlebar locking device 20 is not viewable from outside. At a center part of the handlebar 5, there is provided a user interface (state notification device) 8 which connects a user to the bicycle 1. The user interface 8 is herein a touch panel, for example. The user interface 8 can receive instructions and can display various pieces of information from the bicycle 1 of which the user is to be notified. The handlebar lock system includes the handlebar locking device 20 and the user interface 8.

The frame 2 includes a plurality of members including, for example, a head tube, a top tube, a down tube, and a seat tube. Of these, the head tube 12 is located above the front wheel 3, and a shaft 11a of the front fork 11 is inserted into the head tube 12 (see (c) of FIG. 1). The front fork 11 allows steering while supporting an axis of the front wheel 3. The shaft 11a of the front fork 11 is referred to as a steering column, and the steering column 11a is bifurcated into blades 11b which extend to the front wheel 3.

To an upper end of the front fork 11 (upper end of the steering column 11a), a handling system 10 is attached so as to connect the front fork 11 to the center part of the handlebar 5. This allows the handlebar 5 and the front fork 11 to move together so that it is possible to transmit rotation of the handlebar 5 to the front wheel 3.

To the head tube 12, a top tube 13 and a down tube 14 are connected. According to the present embodiment, (i) a diameter of the down tube 14 located below is larger than that of the top tube 13 and (ii) the handlebar locking device is contained in the down tube 14. Although not particularly illustrated, the down tube 14 has a cover or the like for providing and removing the handlebar locking device 20. The cover is configured so as to be constantly locked to prevent anyone other than the user possessing the key from accessing the handlebar locking device 20.

The handlebar locking device 20 includes a lock pin and a lock pin drive mechanism for moving the lock pin. The handlebar locking device 20 locks the handlebar 5 by restricting the rotation of the handlebar 5 through engaging a tip part of the lock pin with an engagement hole (engaging section) in the steering column (axis) 11a which rotates along with the handlebar 5. As described above, the handlebar locking device 20 is contained and attached in the down tube 14 so that neither the handlebar locking device 20 nor the engagement hole in the steering column 11a can be viewed from the outside of the bicycle 1.

(Schematic Configuration of Handlebar Locking Device 20)

Figure 2:
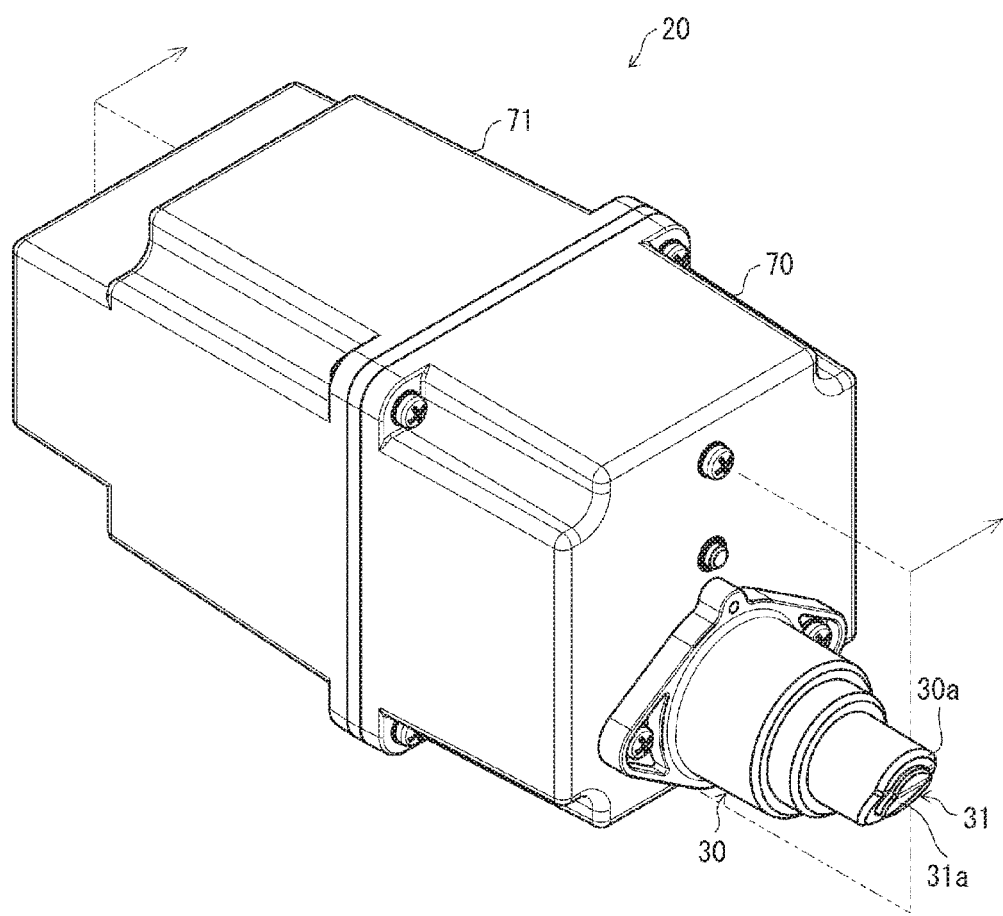
FIG. 2 is a view illustrating an appearance of the handlebar locking device.

FIG. 2 is a view illustrating an appearance of the handlebar locking device 20. As illustrated in FIG. 2, the handlebar locking device 20 has a rectangular parallelepiped appearance and includes a lock pin unit 30 which is provided below a center of one side surface extending along a length of the handlebar locking device 20. In the lock pin unit 30, a lock pin unit 30 is contained so that an axis of the lock pin 31 extends along the length of the handlebar locking device 20. The handlebar 5 is locked in a case where a tip part 31a of the lock pin 31 protrudes. The handlebar 5 is unlocked in a case where the tip part 31a is retracted. The tip part 31a of the lock pin 31 will be hereinafter referred to as "pin tip part 31a". FIG. 2 shows that the pin tip part 31a is not protruding. Note that for convenience, the following description will assume that the pin tip part 31a of the handlebar locking device 20 protrudes toward a front surface side of the handlebar locking device 20 (i.e. protrudes forwards).

Figure 3:
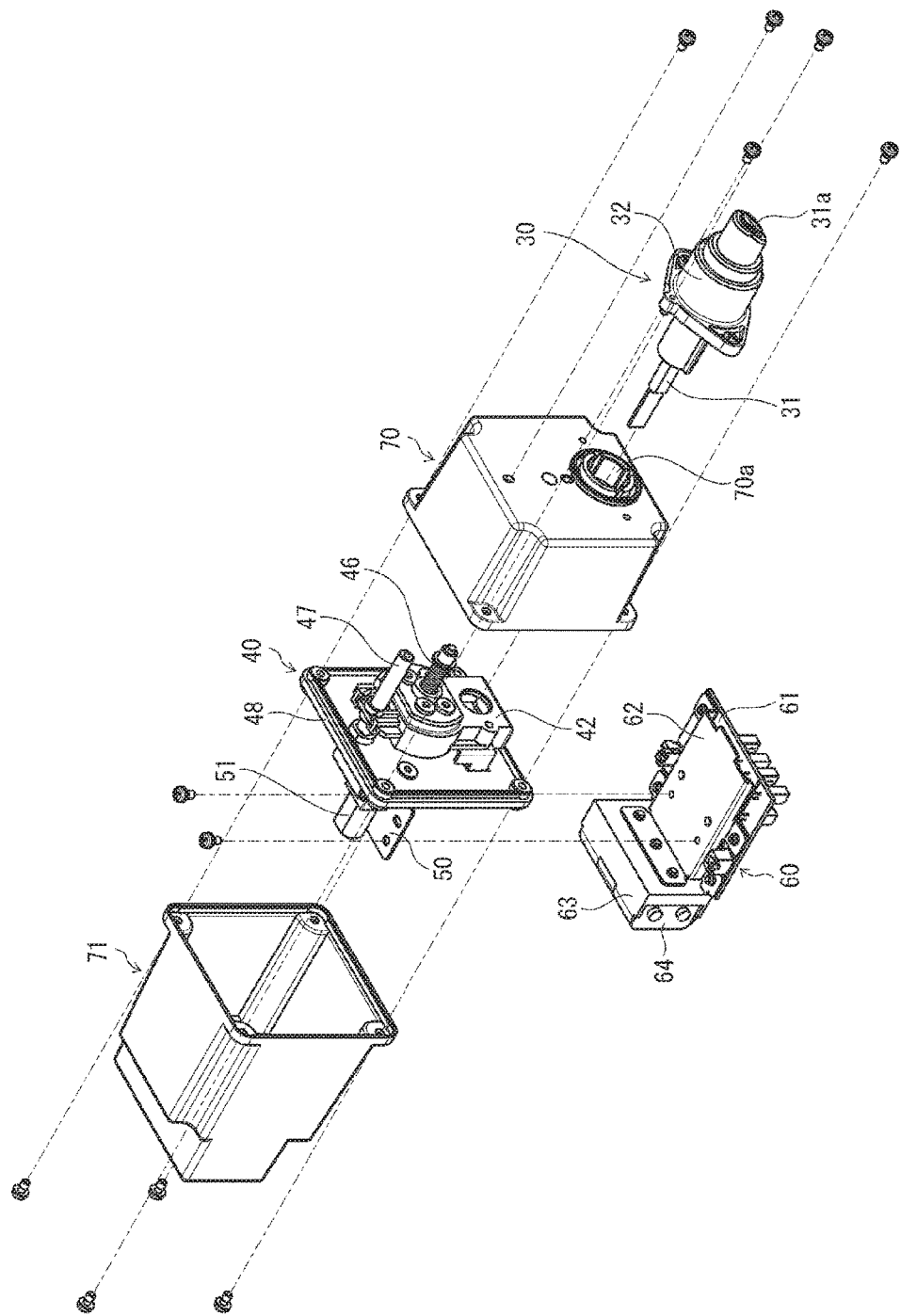
FIG. 3 is an exploded perspective view illustrating an appearance of the handlebar locking device.

FIG. 3 is an exploded perspective view illustrating the handlebar locking device 20. As illustrated in FIG. 3, the handlebar locking device 20 includes, for example, the lock pin unit 30, a drive unit 40, a control unit 60, a front cover 70, and a rear cover 71.

The lock pin unit 30 supports the lock pin 31 so that the lock pin 31 can move axially. The lock pin unit 30 controls the lock pin 31 to move along with movement of a slider 42 of the drive unit 40 (described later) so that the pin tip part 31a protrudes from or is retracted into a tip 32b of an adapter 32.

The drive unit 40 controls the slider 42 to move as described above. The drive unit 40 includes a plate-like case 48 on which a motor 51, a screw shaft 46, and the like are mounted in addition to the slider 42. The lock pin drive mechanism is constituted by (i) the members of the lock pin unit 30 other than the lock pin 31 and (ii) the drive unit 40.

The control unit 60 communicates with a device outside of the handlebar locking device 20. In a case where the control unit 60 receives a signal instructing locking or unlocking of the handlebar 5, the control unit 60 controls the movement of the slider 42 of the drive unit 40. The control unit 60 is also configured so as to (i) identify positions of the slider 42 and of the lock pin 31, (ii) judge, based on information about the positions thus identified, an operation state of the handlebar locking device 20, and then (iii) output a result of the judgment from the handlebar locking device 20. The control unit 60 includes an operation state identifying section and a transmitting section.

The front cover 70 and the rear cover 71 are each a box-shaped member having one side open. The front cover 70 covers a front half of the handlebar locking device 20, and the rear cover 71 covers a rear half of the handlebar locking device 20.

The drive unit 40 and the control unit 60 are configured to be integrated together with use of screws or the like. An integrated member thus obtained is combined with the front cover 70 and the rear cover 71 so that the plate-like case 48 is sandwiched between the front cover 70 and the rear cover 71. A combined member thus obtained is then fixed with use of screws or the like from both directions in which the plate-like case 48 is sandwiched.

The front cover 70 has, on a front surface thereof, an opening 70a through which the lock pin unit 30 is to be inserted from outside. The lock pin unit 30 is to be inserted through the opening 70a and then fixed with use of screws or the like while the adapter 32 is exposed.

(Detailed Configuration of Handlebar Locking Device 20)

Figure 4:
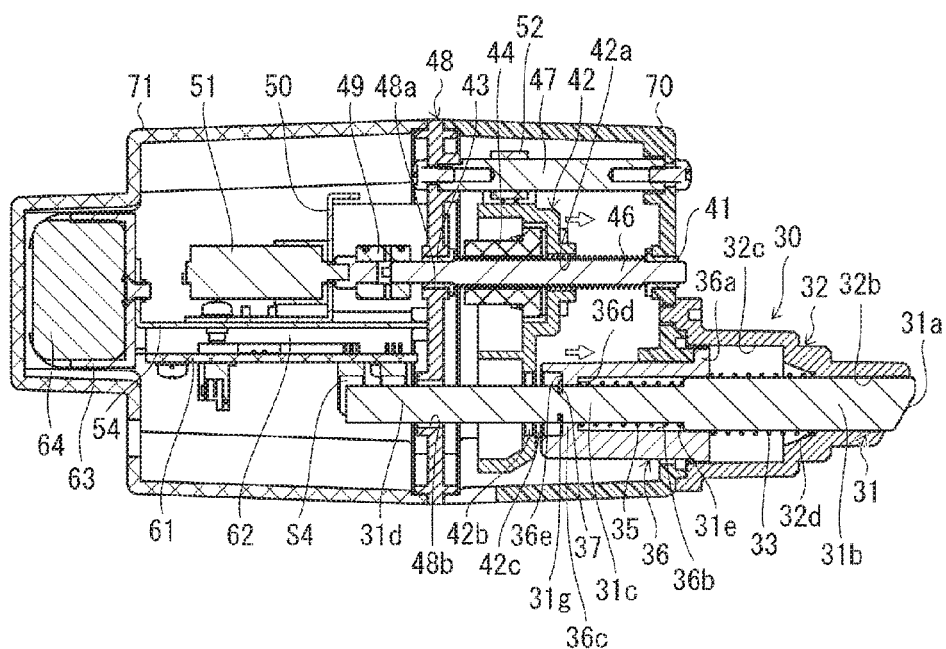
FIG. 4 is a cross-sectional view which illustrates the handlebar locking device and which is taken along a plane indicated by broken lines in FIG. 2.
Figure 5:
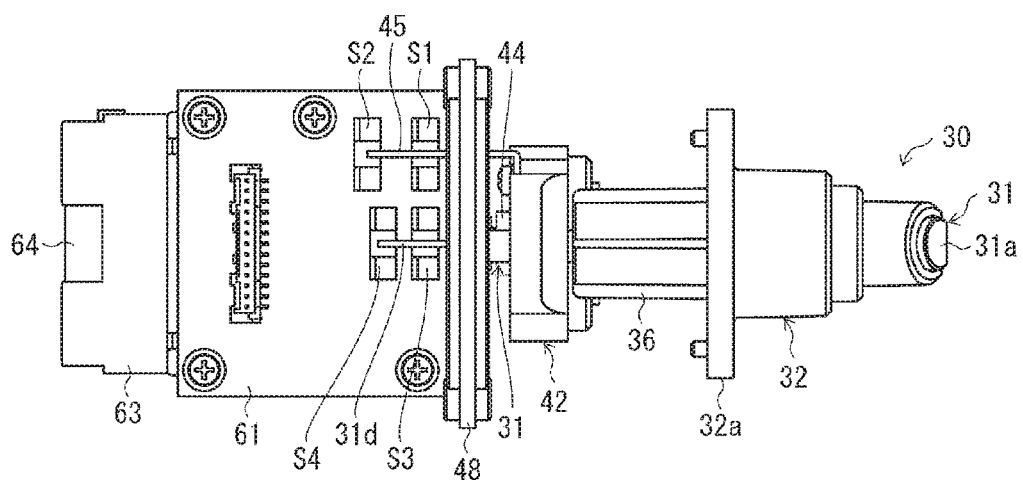
FIG. 5 is a bottom view illustrating the handlebar locking device while a front cover and a rear cover are removed.
Figure 6:
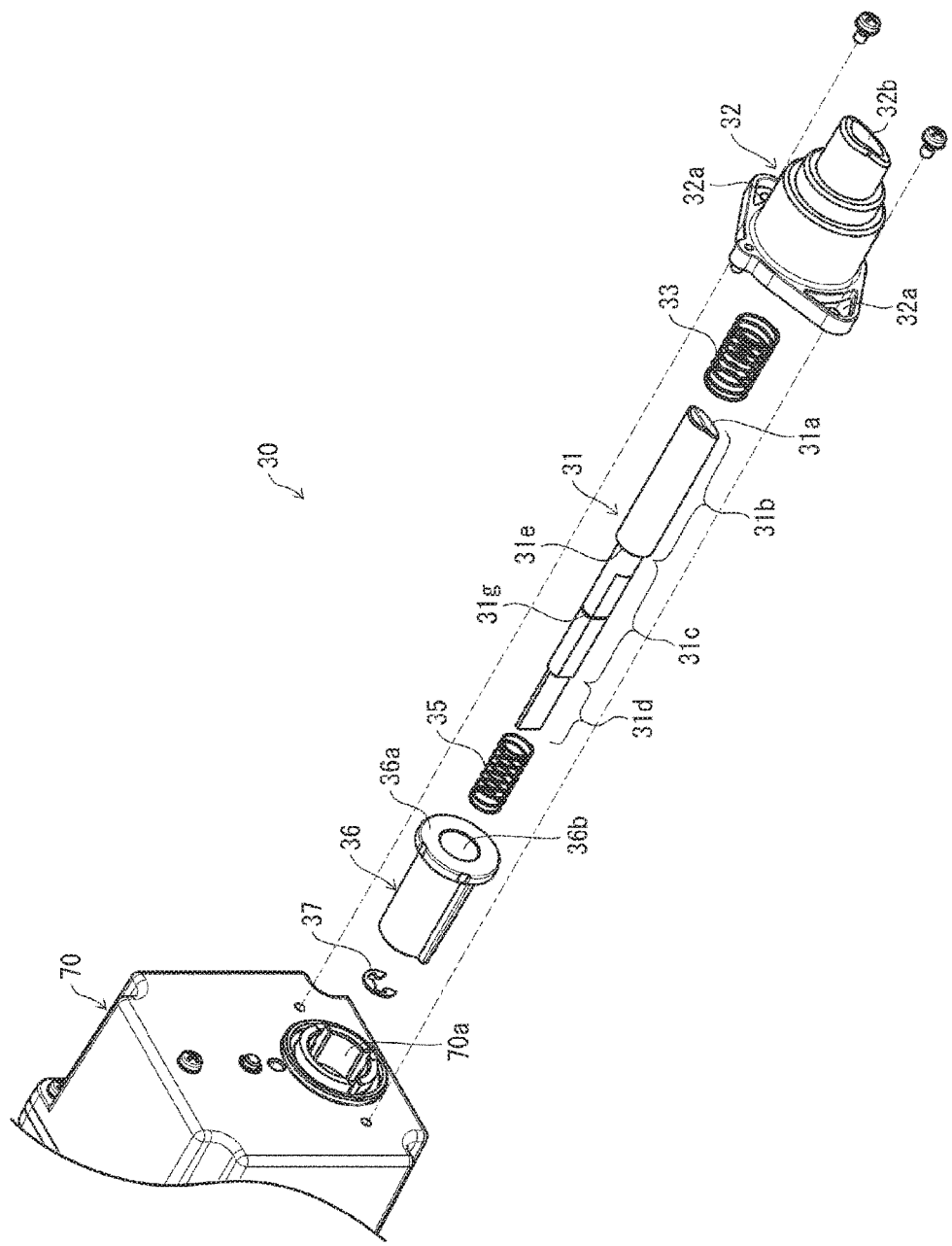
FIG. 6 is an exploded perspective view illustrating a lock pin unit of the handlebar locking device.
Figure 7:
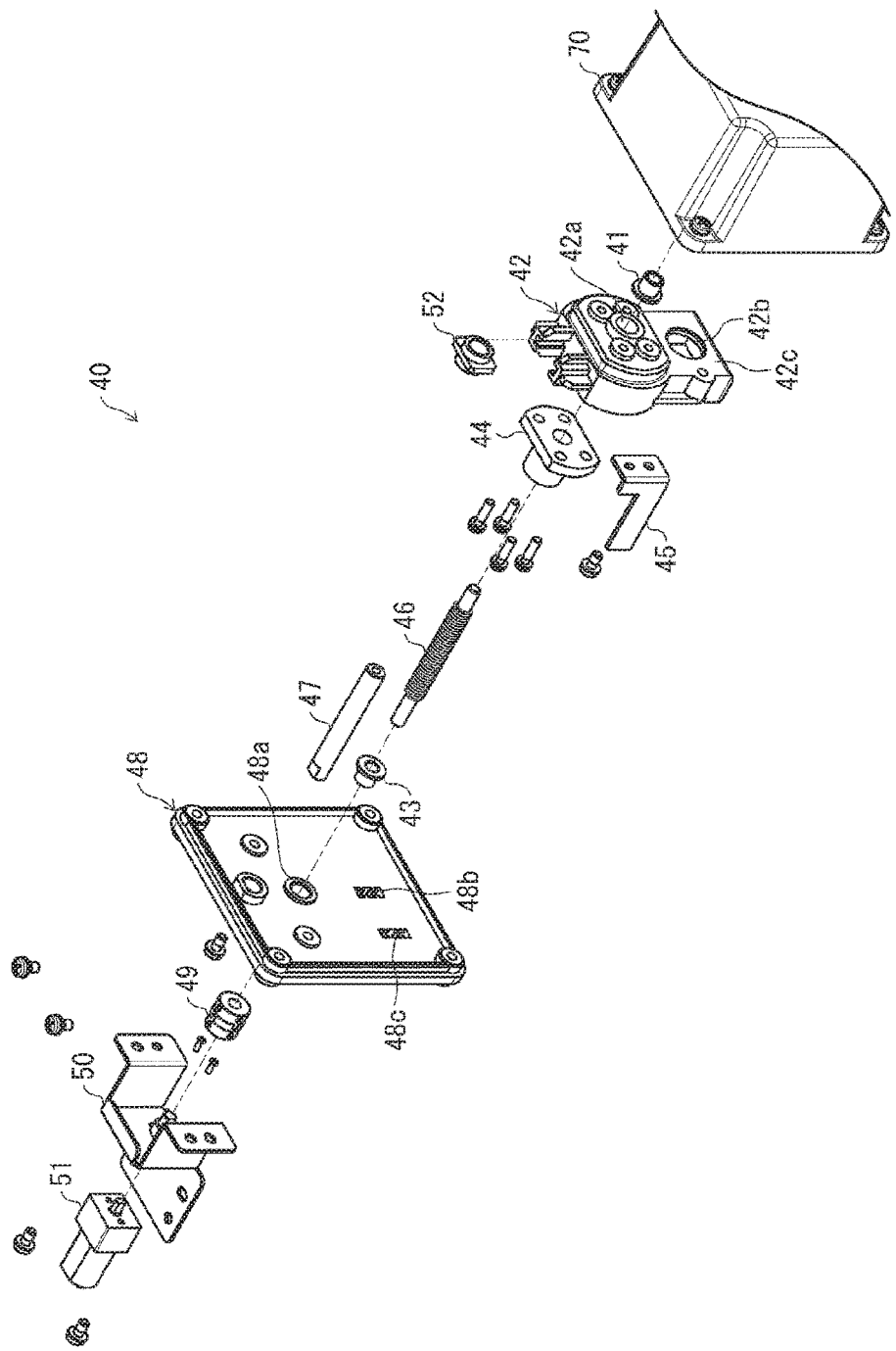
FIG. 7 is an exploded perspective view illustrating a drive unit of the handlebar locking device.
Figure 8:
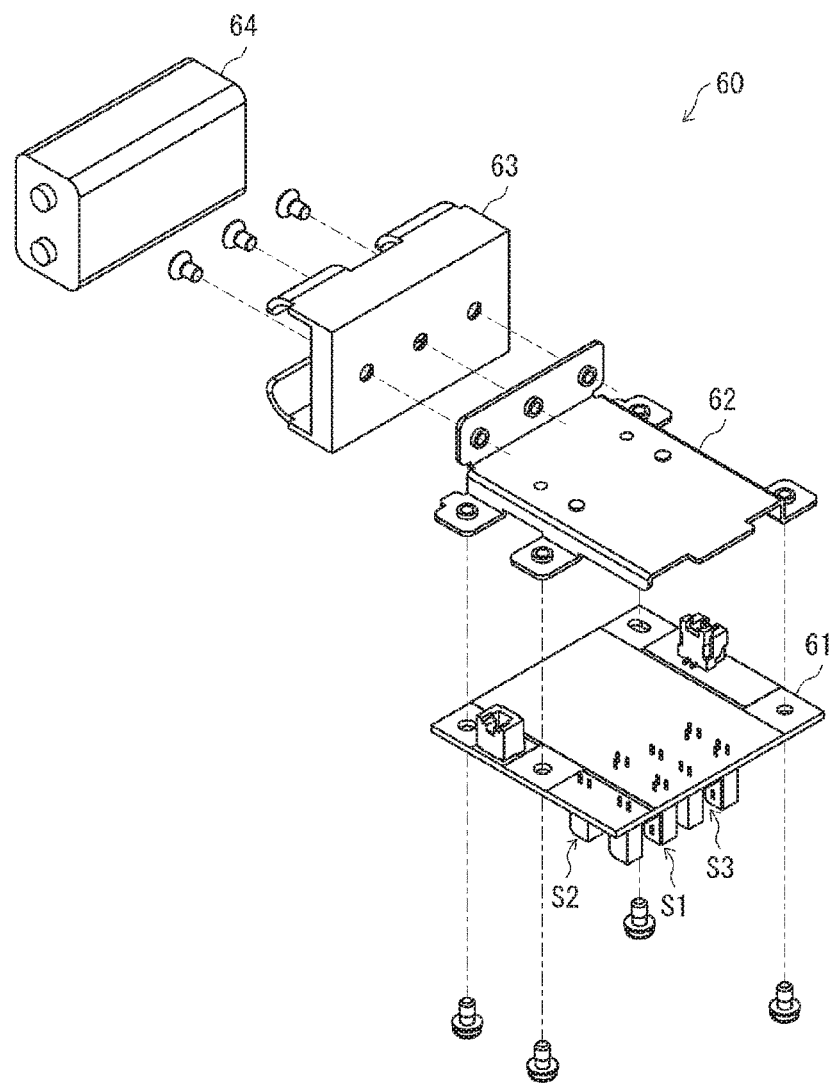
FIG. 8 is an exploded perspective view illustrating a control unit of the handlebar locking device.

The configuration of the handlebar locking device 20 will be described in more detail below with reference to FIGS. 4 through 8. FIG. 4 is a cross-sectional view which illustrates the handlebar locking device 20 and which is taken along a plane indicated by imaginary lines in FIG. 2. FIG. 5 is a bottom view illustrating the handlebar locking device 20 while the front cover and the rear cover are removed. Note that FIG. 5 shows that the pin tip part 31a is not protruding. FIG. 6 is an exploded perspective view illustrating the lock pin unit 30. FIG. 7 is an exploded perspective view illustrating the drive unit 40. FIG. 8 is an exploded perspective view illustrating the control unit 60.

A configuration of the lock pin unit 30 will be described first with reference to FIGS. 4 through 6. As illustrated in FIGS. 4 through 6, the lock pin unit 30 includes, for example, the lock pin 31, the adapter 32, a first spring 33, a second spring 35, a holder 36, and a retaining ring 37.

The lock pin 31 includes (i) a thick shaft 31b included in the pin tip part 31a and (ii) a thin shaft 31c at a center part, and (iii) a thin plate part 31d located toward a rear end. A difference in diameter results in a first step 31e between the thick shaft 31b and the thin shaft 31c. The thin shaft 31c has a groove 31g into which the retaining ring 37 for fixing the lock pin 31 to the holder 36 is to be fitted. The thin plate part 31d is provided so as to (i) pass through a rectangular hole 48b of the plate-like case 48 of the drive unit 40 and (ii) protrude toward a rear side (back side) of the plate-like case 48. The thin plate part 31d serves as a detection piece for front and rear lock pin position sensors S3 and S4 which are provided in the control unit 60 (described later). The thin plate part 31d will be hereinafter referred to as lock pin-specific detection piece 31d.

The adapter (front side support member) 32 has, on an outer peripheral part thereof, an attachment part 32a having a flanged shape. After the adapter 32 is incorporated into the other members included in the lock pin unit 30, the adapter 32 is attached to an outer surface of the front cover 70 via the attachment part 32a with use of screws or the like. In addition, the adapter 32 has a shaft hole 32b into which the lock pin 31 is to be inserted. The adapter 32 also has, on a rear side (back side) thereof, an insertion recess 32c which is connected to the shaft hole 32b and into which a flange part 36a-side of the holder 36 is inserted.

The shaft hole 32b has an inner diameter corresponding to the thick shaft 31b. The insertion recess 32c has an inner diameter corresponding to an outer diameter of the flange part 36a which is larger in diameter than the shaft hole 32b. A space between the shaft hole 32b and the insertion recess 32c expands in a mortar-like shape toward the insertion recess 32c. A first pressing part 32d for pressing a tip of the first spring 33 against a bottom part of the mortar is provided.

Meanwhile, the holder (rear side support member) 36 has the flange part 36a on a front outer peripheral part thereof as described above. The flange part 36a-side is inserted into the insertion recess 32c of the adapter 32 and then slid in the insertion recess 32c. In a case where a rear surface (back surface) of the flange part 36a is pressed against an outer peripheral part of the opening 70a of the front cover 70, the holder 36 is restricted from moving backwards. This causes the holder 36 to move along the axis of the lock pin 31 in the insertion recess 32c.

The holder 36 also has a shaft hole 36b into which the lock pin 31 is to be inserted. The shaft hole 36b has an inner diameter corresponding to the thick shaft 31b. A rear end part of the shaft hole 36b forms a bottom part 36c by being narrowed to an inner diameter corresponding to the thin shaft 31c. At a front surface of the bottom part 36c, a second pressing part 36d for pressing a rear end of the second spring 35 against the front surface of the bottom part 36c is provided. At a rear surface (back surface) of the bottom part 36c, a third pressing part 36e is provided. Against the third pressing part 36e, the retaining ring 37 attached to the thin shaft 31c is pressed against.

The lock pin 31 has a length so that, while the pin tip part 31a is retracted, (i) the thick shaft 31b reaches the flange part 36a of the holder 36 and (ii) the lock pin-specific detection piece 31d reaches the rear lock pin position sensor S4 so as to shade the rear lock pin position sensor S4.

The first spring 33 is provided around an outer circumference of the thick shaft 31b. The first spring 33 is provided in the adapter 32 while (i) the tip of the first spring 33 is pressed against the first pressing part 32d of the adapter 32 and (ii) a rear end of the first spring 33 is pressed against the flange part 36a inserted into the insertion recess 32c.

Meanwhile, the second spring 35 is provided around an outer circumference of the thin shaft 31c. The second spring 35 is provided in the holder 36 while (i) a tip of the second spring 35 is pressed against the first step 31e between the thick shaft 31b and the thin shaft 31c and (ii) a rear end of the second spring 35 is pressed against the second pressing part 36d of the holder 36.

The lock pin unit 30 is integrated with the adaptor 32 by (i) inserting the first spring 33, the lock pin 31, the second spring 35, and the holder 36 in this order into the adapter 32 and then (ii) fixing the retaining ring 37 to the groove 31g. In this state, the lock pin 31 is fixed to the holder 36 with the retaining ring 37 and the second spring 35. With the retaining ring 37 and the second spring 35, a latching part is constituted so as to cause the lock pin 31 to move along with the holder 36 by latching the lock pin 31 onto the holder 36 until the holder 36 moves to a position so that the first spring 33 is completely compressed.

A configuration of the drive unit 40 will be described next with reference to FIGS. 4, 5, and 7. As illustrated in FIGS. 4, 5, and 7, the drive unit 40 includes, for example, a first bearing 41, the slider 42, a second bearing 43, a nut 44, a slider-specific detection piece 45, the screw shaft 46, a shaft 47, the plate-like case 48, a coupling 49, a motor bracket 50, the motor 51, and a third bearing 52.

The plate-like case 48 has a circular hole 48a at an upper part of a center part. A rear end part of the screw shaft 46 is inserted into the circular hole 48a through the second bearing 43. The screw shaft 46 is provided parallel to the lock pin 31. A front end part of the screw shaft 46 is supported by the first bearing 41 attached to the inside of the front cover 70. To the rear side of the plate-like case 48, the motor 51 is attached via the motor bracket 50. The motor 51 is a motor which can be rotated reversibly. The rear end part of the screw shaft 46 is connected to a drive shaft of the motor 51 at the coupling 49. This allows the screw shaft 46 to reversibly rotate in response to driving of the motor 51.

Into the nut 44, the screw shaft 46 is screwed. The nut 44 is fixed to the slider 42. The slider 42 has a circular hole 42a and a circular hole 42b which are arranged vertically. The screw shaft 46 is inserted into the circular hole 42a above. The lock pin 31 is inserted into the circular hole 42b below.

The third bearing 52 is attached to an upper part of the slider 42. The shaft 47 is inserted into the third bearing 52. The shaft 47 is fixed to the plate-like case 48 and to the inside of the front cover 70, and is provided parallel to the lock pin 31.

The upper part of the slider 42 is fixed to the shaft 47 via the third bearing 52. Therefore, in a case where the screw shaft 46 rotates, the nut 44 moves parallel to the axis of the screw shaft 46. This causes the slider 42 to move parallel to the nut 44. The nut 44 moves in a direction corresponding to a direction of rotation of the screw shaft 46. Specifically, in a case where the screw shaft 46 positively rotates, the nut 44 moves from a home position in a direction in which the lock pin 31 is to be pushed out (hereinafter, such a direction will be referred to as "push-out direction"). In a case where the screw shaft 46 negatively rotates, the nut 44 moves in a direction back to the home position, which is the opposite the push-out direction.

A surface 42c around the circular hole 42b of the slider 42 serves as a contact surface. In a case where the slider 42 moves in the push-out direction, the surface 42c comes into contact with a rear end part of the holder 36 in the lock pin unit 30 so as to cause the holder 36 to move in the push-out direction. The circular hole 42b is formed so as to be larger than an outer diameter of the retaining ring 37 attached to the lock pin 31, so that a part of the lock pin 31, which part is located at the retaining ring 37, can pass through the circular hole 42b. In this way, in a case where (i) the holder 36 is pushed by the slider 42 to move in the push-out direction and (ii) the lock pin 31 cannot move in the push-out direction along with the holder 36, it is still possible to allow the lock pin 31 to move backwards. The slider 42, the screw shaft 46, the motor 51, the shaft 47, and the like constitute a push-out section.

To a bottom part of the slider 42, the slider-specific detection piece 45 is attached. The slider-specific detection piece 45 is a detection piece for front and rear slider position sensors S1 and S2 (described later) which are provided on the control unit 60.

The plate-like case 48 has rectangular holes 48b and 48c. Through the rectangular holes 48b and 48c, the slider-specific detection piece 45 and the lock pin-specific detection piece 31d at the rear end part of the lock pin 31 (described earlier) protrude to the rear side (back side) of the plate-like case 48.

The lock pin unit 30 and the drive unit 40 constitute the drive mechanism for the lock pin 31. The driving mechanism can be described as follows. That is, the drive mechanism of the lock pin 31 includes (I) the adapter (front side support member) 32 through which the lock pin 31 passes and which (i) supports an outer circumference of the pin tip part 31a of the lock pin 31 so that the lock pin 31 can move axially, (ii) has a front end part from which the pin tip part 31a protrudes, and (iii) has an insertion recess 32c that is located at a rear end part of the adapter 32 and that is provided axially, (II) the holder (rear side support member) 36 through which the lock pin 31 passes and which (i) supports an outer circumference of a part of the lock pin 31, which part is located behind the pin tip part 31a, so that the lock pin 31 can move axially and (ii) has a front end part that is inserted into the insertion recess 32c of the adapter 32 so as to slide in the insertion recess 32c, (III) the slider 42 and the like constituting a push-out section which is configured so that (i) while the handlebar 5 is locked, the push-out section is in contact with the holder 36 so as to push out the holder 36 in a forward direction in which the pin tip part 31a protrudes and (ii) while the handlebar 5 is unlocked, the push-out section returns to a home position at which the push-out section was located before pushing out the holder 36, (IV) the first spring 33 which is provided between the adapter 32 and the holder 36 and which becomes compressed in a case where the holder 36 is pushed out in the forward direction by the slider 42 and the like, (V) the latching part (second spring 35, retaining ring 37) which causes the lock pin 31 to move along with the holder 36 by latching the lock pin 31 onto the holder 36 until the holder 36 moves to a position so that the first spring 33 is completely compressed, and (VI) the second spring 35 which is provided between the lock pin 31 and the holder 36 and which becomes compressed in a case where the lock pin 31 moves towards the rear end part of the holder 36 while the latching by the latching part is released.

According to the configuration, the lock pin 31 passes through the adapter 32 and the holder 36 so that the lock pin 31 is supported so as to be able to move axially. The pin tip part 31a protrudes from the front end part of the adapter 32 which supports a tip part of the lock pin 31. The holder 36, which supports the lock pin 31 behind the adapter 32, is configured so that the front end part of the holder 36 is inserted into the insertion recess 32c of the adapter 32 so as to slide in the recess 32c. While the handlebar 5 is locked, the holder 36 is pushed out by the slider 42 and the like in a forward direction in which the pin tip part 31a protrudes.

The first spring 33 is provided between the adapter 32 and the holder 36, and is compressed by the holder 36 being pushed out in the forward direction. While the handlebar 5 is unlocked, in a case where the slider 42 and the like return to the home position at which the slider 42 and the like were located before pushing out the holder 36, the holder 36 also returns to an original position due to a restoring force of the first spring 33.

While the holder 36 is moving to the position so that the first spring 33 is completely compressed, the lock pin 31 is latched onto the holder 36 by the latching part. This allows the lock pin 31 to move along with the holder 36, so that the pin tip part 31a protrudes from the adapter 32. In a case where the holder 36 returns to the original position, the lock pin 31 returns to an original position along with the holder 36.

The second spring 35 is provided between the lock pin 31 and the holder 36. In a case where the latching by the latching part is released so that the pin tip part 31a cannot protrude sufficiently from the adapter 32, the second spring 35 is compressed so as to allow the lock pin 31 to move towards the rear end part of the holder 36. In this way, even in a case where the pin tip part 31a is not aligned with an engagement hole 11c when the slider 42 and the like push out the holder 36, it is still possible that, when the tip part of the lock pin is aligned with the engagement hole 11c later, the pin tip part 31a protrudes out due to a restoring force of the second spring 35 so as to be engaged with the engagement hole 11c.

A configuration of the control unit 60 will be described next with reference to FIGS. 4, 5, and 8. As illustrated in FIGS. 4, 5, and 8, the control unit 60 includes, for example, a substrate 61, a substrate bracket 62, a battery holder 63, a battery 64. The substrate 61 is a control substrate on which a CPU, a RAM, a ROM, and the like are mounted. On a bottom surface (back surface) of the substrate 61, the following are mounted: (i) the front and rear slider position sensors S1 and S2 for identifying the position of the slider 42 and (ii) front and rear lock pin position sensors S3 and S4 for identifying the position of the lock pin 31. These position sensor S1 through S4 are each a photosensor including a light-emitting element and a light-receiving element.

Such a substrate 61 is attached to a bottom surface of the substrate bracket 62. A top surface of the substrate bracket 62 is attached to the motor bracket 50 of the drive unit 40. On the substrate bracket 62, the battery 64 can be mounted via the battery holder 63 which is attached to the substrate bracket 62.

Figure 9:
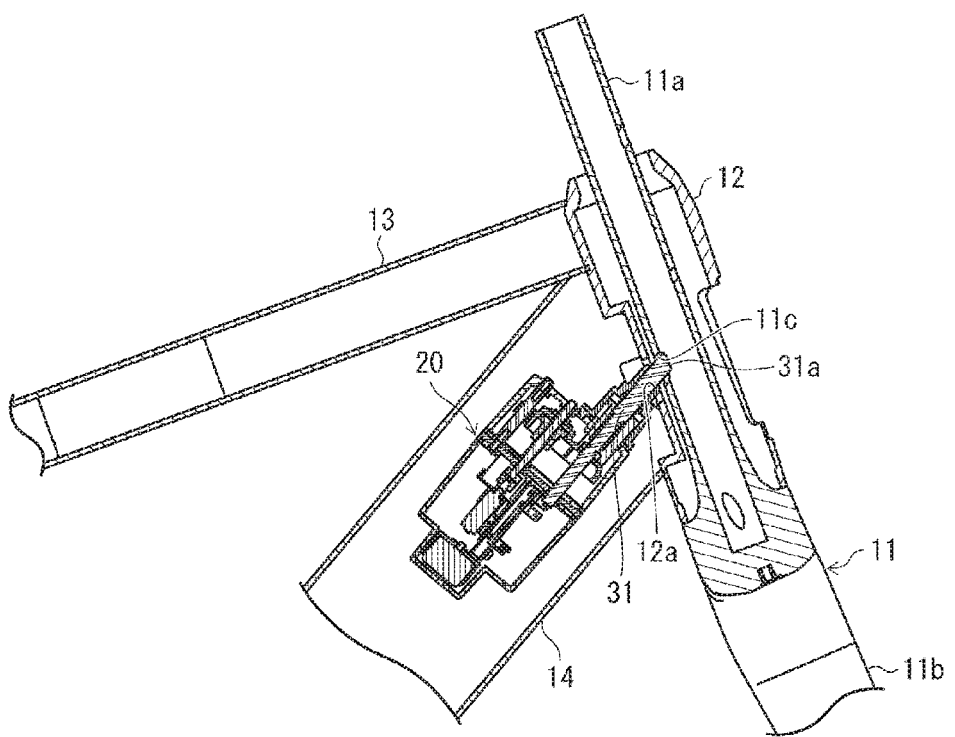
FIG. 9 is a partial side view showing that a protruding part of the handlebar locking device is engaged with an engagement hole of a steering column of the bicycle, so that a handlebar of the bicycle is in a lock state.

FIG. 9 is a partial side view showing that the pin tip part 31a of the lock pin 31 of the handlebar locking device 20 is engaged with the engagement hole 11c made in the steering column 11a of the bicycle 1, so that the handlebar 5 of the bicycle 1 is in a lock state (see (a) and (b) of FIG. 1). As illustrated in FIG. 9, the handlebar locking device 20 is provided in the down tube 14 so that a front surface of the handlebar locking device 20 faces toward the head tube 12 located frontward. A side surface of the head tube 12, which side surface faces an inner space of the down tube 14, has a hole 12a into which the pin tip part 31a is to be inserted. The steering column 11a, which is inserted into the head tube 12 and which rotates along with the handlebar 5, has the engagement hole 11c with which the pin tip part 31a is to be engaged. In a case where the pin tip part 31a protruding from the handlebar locking device 20 passes through the hole 12a of the head tube 12 so as to be engaged with the engagement hole 11c of the steering column (axis) 11a which rotates along with the handlebar 5, the handlebar 5 is locked.

Figure 10:
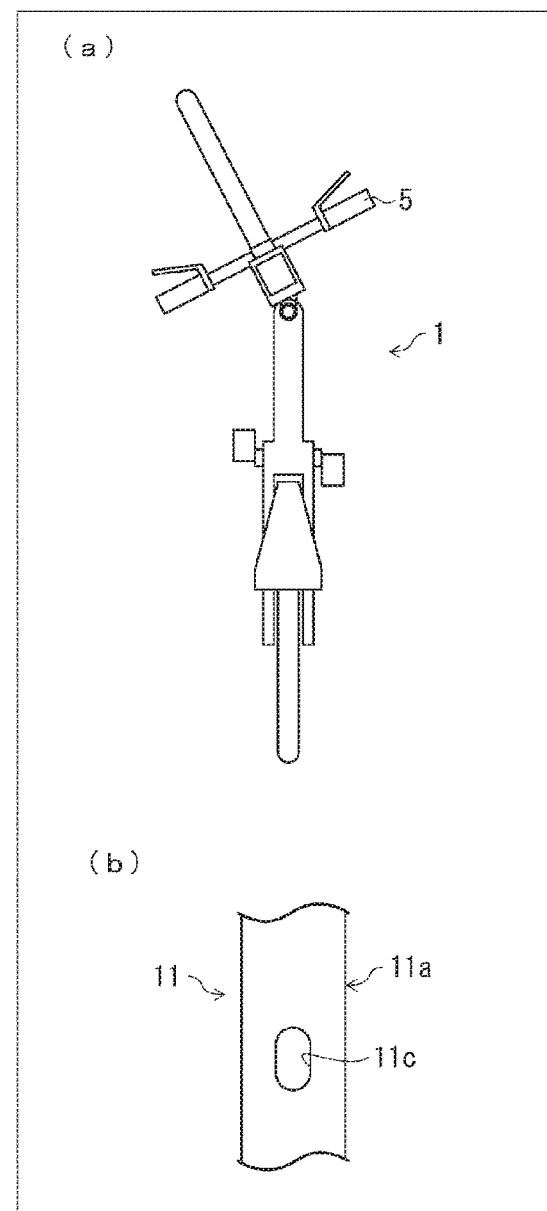
FIG. 10 is a view illustrating a positional relationship between the engagement hole of the steering column and the handlebar.

FIG. 10 is a view illustrating a positional relationship between the engagement hole 11c of the steering column 11a and the handlebar 5. According to the present embodiment, the engagement hole 11c is made in a position of the steering column 11a so as to face the tip part 31a of the lock pin 31 while the handlebar 5 is turning leftwards by a certain angle from a direction facing the front, e.g., while the handlebar 5 is turning by 45° (±5°) (see FIG. 10). In a case where the handlebar 5 is thus locked in a turned position, it is difficult to move the bicycle 1. This allows the handlebar locking device 20 to be used as a lock for preventing theft. Note that the engagement hole 11c used herein can alternatively be a recess instead of a hole.

Although the configuration in which the handlebar 5 is locked while turning leftwards is shown as an example, it is alternatively possible to lock the handlebar 5 while the handlebar 5 is turning rightwards. Alternatively, it is also possible to make two engagement holes 11c so that the handlebar 5 can be locked while turning rightwards or leftwards. Alternatively, it is also possible to lock the handlebar 5 while the handlebar 5 is turning rightwards or leftwards by a maximum angle possible from the direction facing the front. Preferably, a width of the engagement hole 11c has an allowance so as to be larger than a width of the pin tip part 31a. This allows the pin tip part 31a to pass through the engagement hole 11c while the handlebar 5 is turning by a wider angle, and therefore prevent an incomplete lock state (described later) from occurring easily.

(Description of Operation of Handlebar Locking Device 20)

Figure 11:
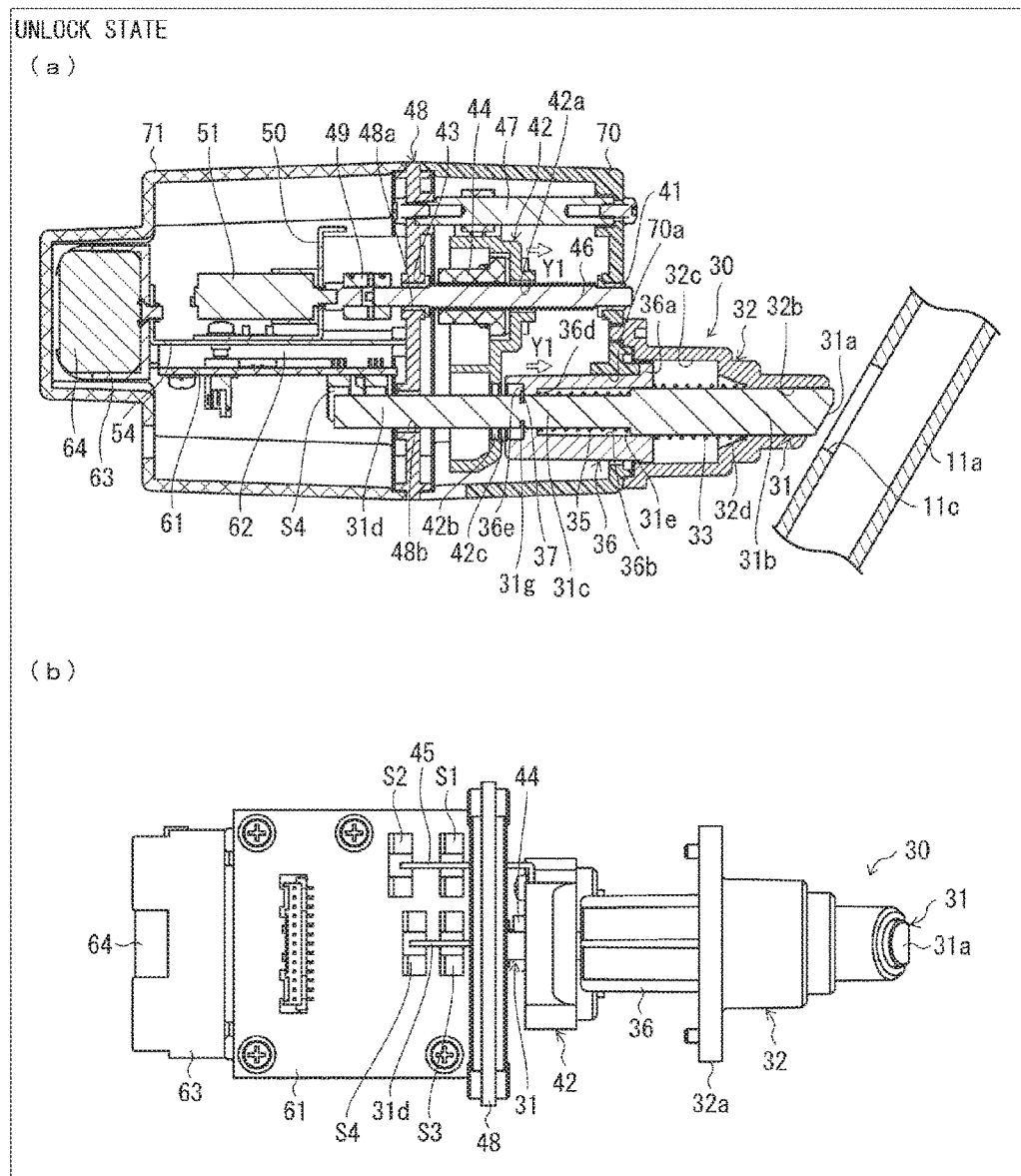
FIG. 11 is a view for describing an unlock state of the handlebar caused by the handlebar locking device.
Figure 12:
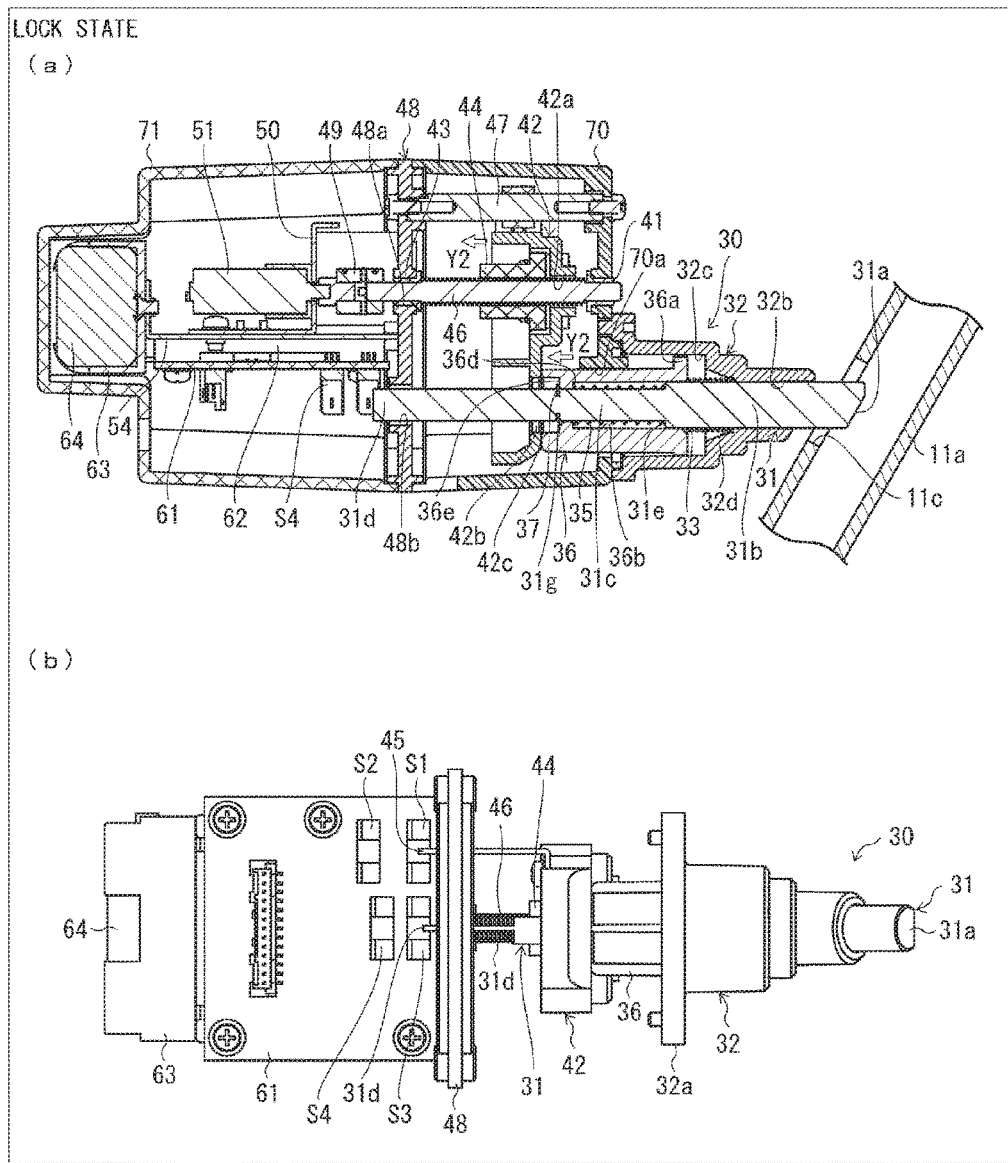
FIG. 12 is a view for describing a lock state of the handlebar caused by the handlebar locking device.
Figure 13:
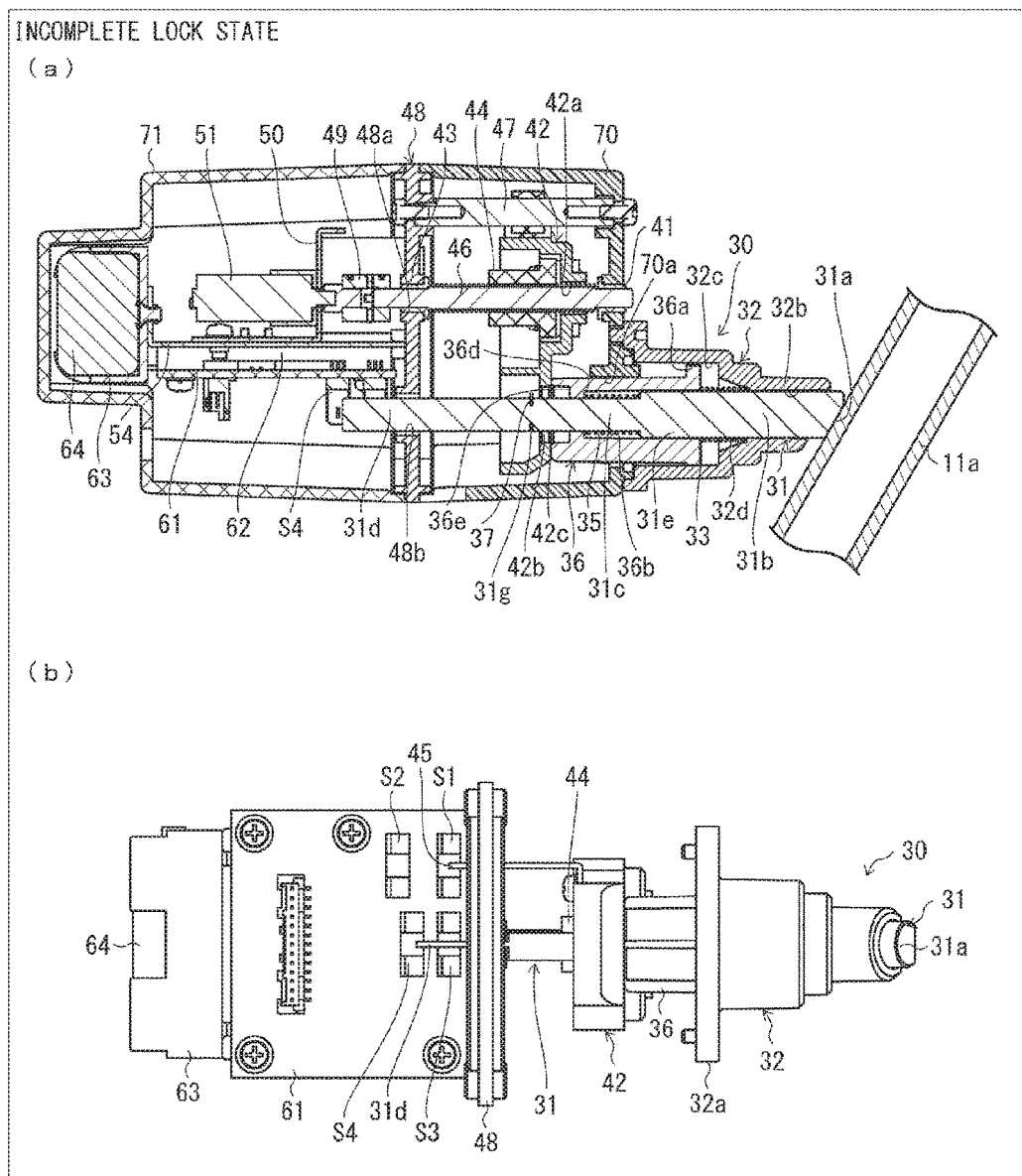
FIG. 13 is a view for describing an incomplete lock state of the handlebar caused by the handlebar locking device.
Figure 14:
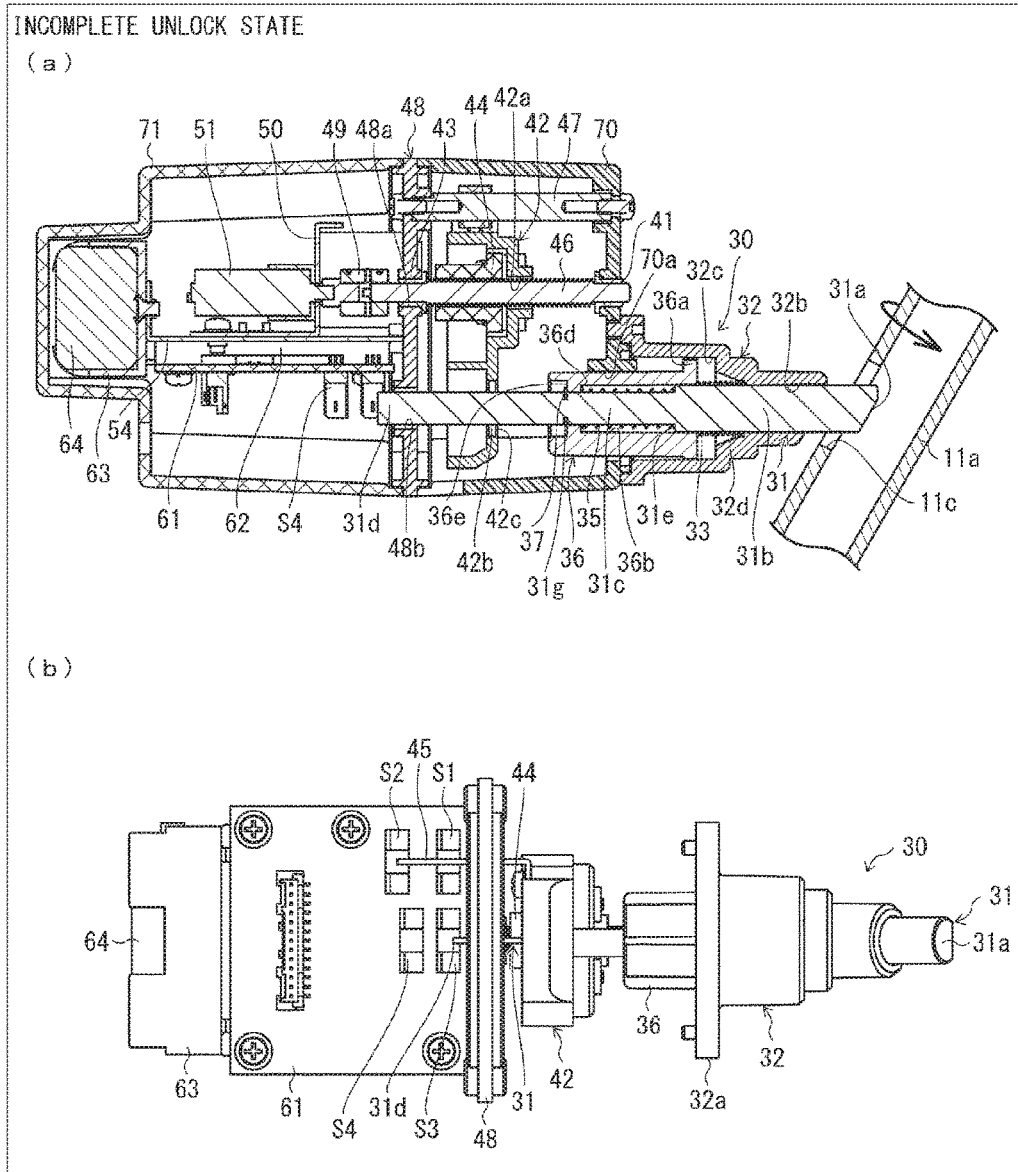
FIG. 14 is a view for describing an incomplete unlock state of the handlebar caused by the handlebar locking device.

An operation of the handlebar locking device 20 will be described next with reference to FIGS. 11 through 14. FIG. 11 is a view for describing an unlock state of the handlebar locking device 20 in which the handlebar 5 is unlocked. FIG. 12 is a view for describing a lock state. FIG. 13 is a view for describing an incomplete lock state. FIG. 14 is a view for describing an incomplete unlock state. In each of FIGS. 11 through 14, (a) is a cross-sectional view illustrating main parts of the handlebar locking device 20 and the steering column 11a and (b) is a view for describing (i) a positional relationship between the front and rear slider position sensors S1 and S2 and the slider-specific detection piece 45 and (ii) a positional relationship between the front and rear lock pin position sensors S3 and S4 and the lock pin-specific detection piece 31d.

As illustrated in (a) of FIG. 11, in an unlock state, the slider 42 is in the home position which is a most backward position. In this state, the holder 36 of the lock pin unit 30 is also in a home position. In a case where the rear end of the first spring 33 presses against the flange part 36a of the holder 36, the rear surface (back surface) of the flange part 36a presses against the outer peripheral part of the opening 70a of the front cover 70.

As illustrated in (b) of FIG. 11, in the unlock state, the slider-specific detection piece 45, which is fixed to the slider 42, shades both the rear slider position sensor S2 and the front slider position sensor S1. Likewise, the lock pin-specific detection piece 31d provided at a rear end side of the lock pin 31 also shades both the rear lock pin position sensor S4 and the front lock pin position sensor S3.

In a case of transition from the unlock state to a lock state, the drive unit 40 drives the motor 51 to rotate forwards. This causes the screw shaft 46, which is connected to the drive shaft of the motor 51 through the coupling 49, to positively rotate. As illustrated in (a) of FIG. 11, the nut 44, into which the screw shaft 46 is screwed, is fixed to the slider 42. The rotation of the slider 42 is prevented by the shaft 47. Therefore, in a case where the screw shaft 46 positively rotates, the slider 42 moves in a push-out direction (forward direction) indicated by the arrow Y1.

In a case where the slider 42 thus moves, the slider-specific detection piece 45 also moves, so that the rear slider position sensor S2 and the front slider position sensor S1, in this order, are transitioned from being shaded to being exposed.

In a case where the slider 42 moves as described above, the holder 36, which is held by the adapter 32 and the first spring 33 in the front cover 70, is pushed out in the push-out direction. This causes the first spring 33 to be compressed. Since the holder 36 is pushed out, the lock pin 31, which is fixed to the holder 36 with the second spring 35 and the retaining ring 31e, is also pushed out in the push-out direction.

Note that in a case where the engagement hole 11c is facing the pin tip part 31a, the pin tip part 31a enters and is engaged with the engagement hole 11c (see (a) of FIG. 12). This prevents the steering column 11a from rotating, and therefore locks the handlebar 5 (lock state).

Along with such a movement of the lock pin 31, the lock pin-specific detection piece 31d also moves, so that the rear lock pin position sensor S4 and the front lock pin position sensor S3, in this order, are transitioned from being shaded to being exposed.

As illustrated in (b) of FIG. 12, in such a lock state, the rear slider position sensor S2 and the front slider position sensor S1 are both exposed. Likewise, the rear lock pin position sensor S4 and the front lock pin position sensor S3 are both exposed.

Meanwhile, in a case where engagement hole 11c is not facing the pin tip part 31a, the pin tip part 31a presses against a side surface of the steering column 11a and does not enter the engagement hole 11c (see (a) of FIG. 13). As a result, the handlebar 5 is put in a state in which the handlebar 5 is incompletely locked (incomplete lock state). The movement of the lock pin 31 is restricted at a midway point. Therefore, from the midway point on, only the holder 36 is pushed by the slider 42 so as to move, so that the second spring 35 is compressed.

As illustrated in (b) of FIG. 13, during such a movement of the lock pin 31, the lock pin-specific detection piece 31d continuously shades the front lock pin position sensor S3. That is, in the incomplete lock state, the rear slider position sensor S2, the front slider position sensor S1, and the rear lock pin position sensor S4 are exposed, while only the front lock pin position sensor S3 is shaded.

Note, however, that even in the incomplete lock state, it is possible to transition to a lock state by causing the handlebar 5 to turn rightwards or leftwards so as to cause the engagement hole 11c to face the pin tip part 31a. When the engagement hole 11c faces the pin tip part 31a, the second spring 35 which is compressed is restored. The restoring force causes the pin tip part 31a to enter the engagement hole 11c.

Meanwhile, for the purpose of transitioning from a lock state to an unlock state, the drive unit 40 drives the motor 51 to rotate backwards. This, as illustrated in (a) of FIG. 12, causes the screw shaft 46 to negatively rotate, so that the slider 42 moves in the direction indicated by the arrow Y2, in which the slider 42 returns to the home position (backward direction).

In a case where the slider 42 thus moves, the slider-specific detection piece 45 also moves, so that the front slider position sensor S1 and the rear slider position sensor S2, in this order, are transitioned from being exposed to being shaded.

In a case where no force is applied to the handlebar 5 to rotate so that there is no large friction between the engagement hole 11c and the pin tip part 31a, a movement of the slider 42 causes the first spring 33, which is compressed, to be restored. The restoring force pushes the holder 36 back to the home position, and consequently pushes the lock pin 31, which is fixed to the holder 36, back to the home position together. This, as illustrated in (a) of FIG. 11, causes the pin tip part 31a to be removed from the engagement hole 11c (unlock state).

Along with such a movement of the lock pin 31, the lock pin-specific detection piece 31d also moves, so that the front lock pin position sensor S3 and the rear lock pin position sensor S4, in this order, are transitioned from being exposed to being shaded.

Meanwhile, in a case where a force is applied to the handlebar 5 to rotate so that there is a large amount of friction between the engagement hole 11c and the pin tip part 31a, a movement of the slider 42 to the home position does not allow the lock pin 31 to move because the pin tip part 31a is caught on the engagement hole 11c (see (a) of FIG. 14). As a result, the handlebar 5 is put in a state in which the handlebar 5 is incompletely unlocked (incomplete unlock state). Since the movement of the lock pin 31 is restricted, the holder 36 also does not move, so that the first spring 33 remains compressed.

Since the lock pin 31 does not move, the following is true. That is, in the incomplete lock state, the front and rear lock pin position sensors S3 and S4 both remain exposed (see (b) of FIG. 14). That is, in the incomplete unlock state, the front and rear slider position sensors S1 and S2 are both shaded, while the front and rear lock pin position sensors S3 and S4 are both exposed.

Note that even in the incomplete unlock state, it is possible to transition to an unlock state by causing the handlebar 5 to turn rightwards or leftwards so as to stop the engagement hole 11c and the pin tip part 31a from catching on each other. When the engagement hole 11c and the pin tip part 31a are no longer caught on each other, the first spring 33 which is compressed is restored. The restoring force causes the pin tip part 31a to be removed from the engagement hole 11c.

(Description of Control Section 100 of Handlebar Locking Device 20)

Figure 15:
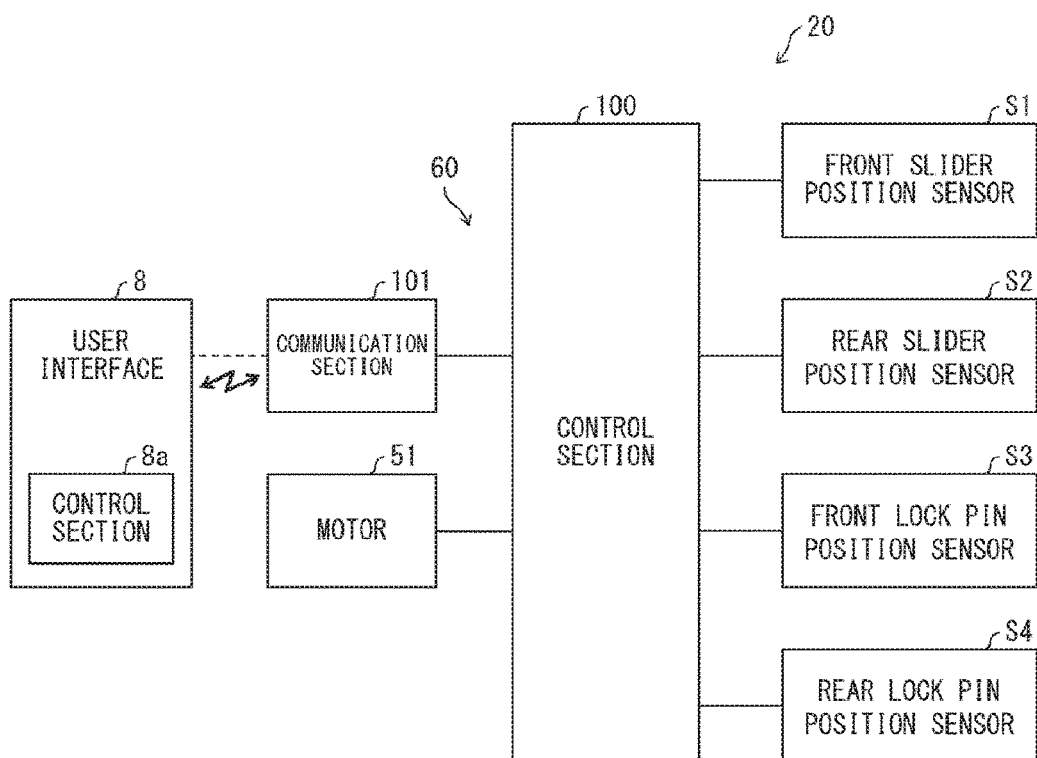
FIG. 15 is a functional diagram of the handlebar locking device.

A control section 100 of the handlebar locking device 20 will be described next with reference to FIGS. 15 through 19. FIG. 15 is a functional diagram of the handlebar locking device 20. As illustrated in FIG. 15, the handlebar locking device 20 includes the control section 100. The control section 100 includes the substrate 61 mounted on the control unit 60, and is connected to, for example, the motor 51, a communication section 101, the front and rear slider position sensors S1 and S2, and the front and rear lock pin position sensors S3 and S4.

The control section 100 controls forward and backward driving of the motor 51 and ON/OFF of the forward and backward driving. The control section 100 also judges an operation state of the handlebar locking device 20 according to signals which (i) are supplied from the front and rear slider position sensors S1 and S2 and the front and rear lock pin position sensors S3 and S4 and (ii) indicate shading and exposure of the sensors. Other than a lock state, an unlock state, an incomplete lock state, and an incomplete unlock state described earlier, the examples of the operation state encompass (i) a transitioning-to-lock state in which a transition from an unlock state to a lock state is being made and (ii) a transitioning-to-unlock state in which a transition from a lock state to an unlock state is being made.

The communication section (transmitting section) 101 allows the handlebar locking device 20 to communicate with an external end, and is mounted on the substrate 61. According to the present embodiment, the communication section 101 carries out wireless communication or wired communication with the user interface (state notification device) 8 mounted on the bicycle 1. The communication section 101 transmits, to the control section 100, a lock instruction or an unlock instruction supplied from the user interface 8. The communication section 101 also transmits, to the user interface 8, information indicative of an operation state of the handlebar locking device 20, which operation state has been judged by the control section 100. According to the information which has been received from the control section 100 and which indicates the operation state of the handlebar locking device 20, the user interface 8 notifies a user of the operation state of the handlebar locking device 20 through displaying the operation state. On the user interface 8, a control section 8a is mounted. The control section 8a includes a receiving section and a notifying section of the state notification device.

Figure 16:
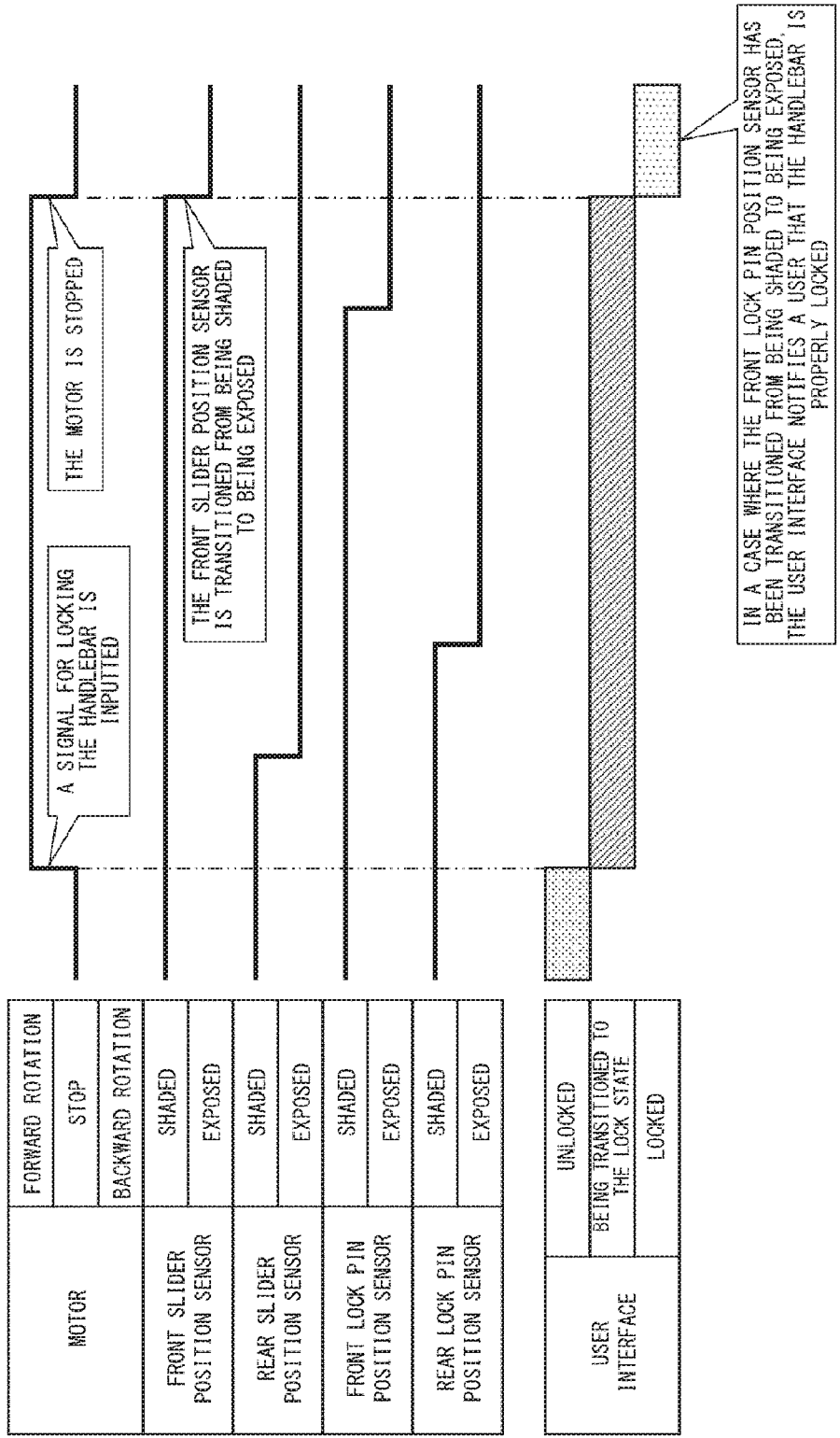
FIG. 16 is a timing chart showing the following in a case where a transition from an unlock state (state shown in FIG. 11) to a lock state (state shown in FIG. 12) is being made by the handlebar locking device in response to a lock instruction received: (i) a drive signal from a motor, (ii) output signals from front and rear slider position sensors, (iii) output signals from front and rear lock pin position sensors, and (iv) a displayed content of a user interface.

FIG. 16 is a timing chart showing the following in a case where a transition from an unlock state (state shown in FIG. 11) to a lock state (state shown in FIG. 12) is being made in response to a lock instruction received: (i) a drive signal from the motor 51, (ii) output signals from the front and rear slider position sensors S1 and S2, (iii) output signals from the front and rear lock pin position sensors S3 and S4, and (iv) a displayed content of the user interface 8.

As illustrated in FIG. 16, the control section 100 judges that a state is an unlock state in a case where (i) the motor 51 has stopped and (ii) all of the output signals from the front and rear slider position sensors S1 and S2 and from the front and rear lock pin position sensors S3 and S4 indicate "shaded". Then, the user interface 8 displays "the handlebar is unlocked".

In this state, in a case where a signal for locking the handlebar 5 is inputted, such as an input of a lock instruction, the control section 100 turns on the motor 51 so as to drive the motor 51 to rotate forwards. This causes the slider 42 to start moving in the push-out direction as described above, so that the rear slider position sensor S2 and the front slider position sensor S1, in this order, are transitioned from being shaded to being exposed. The control section 100 turns off the motor 51 with a timing with which the front slider position sensor S1 is transitioned from being shaded to being exposed.

In a case where the lock pin 31 is pushed out along with the movement of the slider 42 and consequently the handlebar 5 faces a proper direction to be locked, the lock pin 31 is pushed out smoothly so that the pin tip part 31a enters the engagement hole 11c. As a result, the rear lock pin position sensor S4 and the front lock pin position sensor S3, in this order, are transitioned from being shaded to being exposed. The control section 100 judges that a state is a lock state in a case where the front lock pin position sensor S3 is transitioned from being shaded to being exposed before the front slider position sensor S1 is transitioned from being shaded to being exposed. Then, the user interface 8 displays "lock" indicating that the handlebar 5 is properly locked.

During a period between (i) a time point at which the motor 51 is turned on to drive to rotate forwards and (ii) a time point at which the state is judged as a lock state, the control section 100 judges that the state is at a midway point of being transitioned to the lock state. Then, the user interface 8 displays "being transitioned to the lock state" indicating that the state is at a midway point of being transitioned to the lock state.

Figure 17:
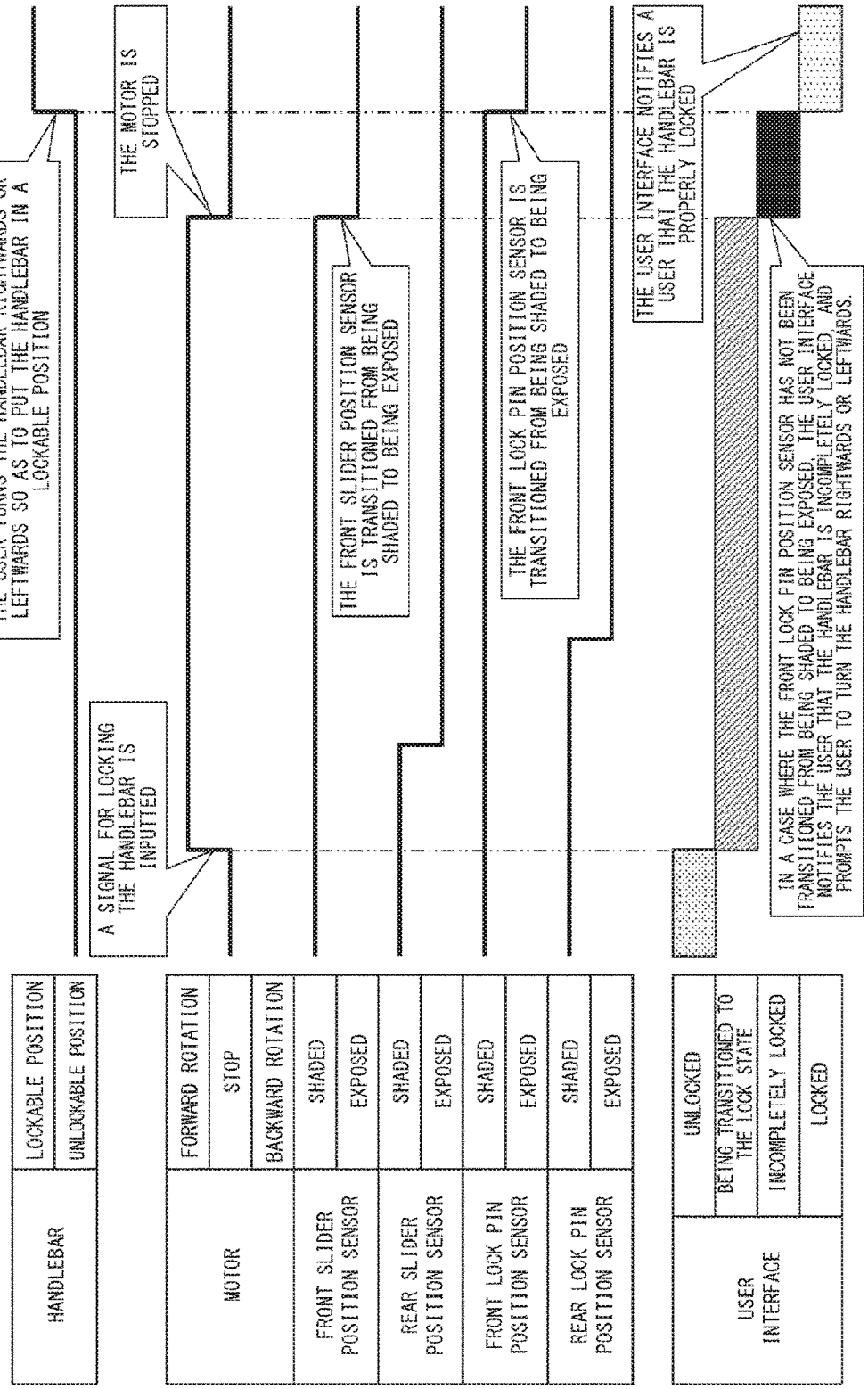
FIG. 17 is a timing chart showing the following in a case where a transition from an unlock state (state shown in FIG. 11) to an incomplete lock state (state shown in FIG. 13) to a lock state (state shown in FIG. 12) is being made by the handlebar locking device in response to a lock instruction received: (i) a drive signal from the motor, (ii) output signals from the front and rear slider position sensors, (iii) output signals from the front and rear lock pin position sensors, and (iv) a displayed content of the user interface.

FIG. 17 is a timing chart showing the following in a case where a transition from an unlock state (state shown in FIG. 11) to an incomplete lock state (state shown in FIG. 13) to a lock state (state shown in FIG. 12) is being made in response to a lock instruction received: (i) a drive signal from the motor 51, (ii) output signals from the front and rear slider position sensors S1 and S2, (iii) output signals from the front and rear lock pin position sensors S3 and S4, and (iv) a displayed content of the user interface 8.

A comparison with FIG. 16 indicates that because the pin tip part 31a presses against the side surface of the steering column 11a so as not to enter the engagement hole 11c, the front lock pin position sensor S3 remains shaded. In a case where the front lock pin position sensor S3 remains shaded even though the front slider position sensor S1 is transitioned from being shaded to being exposed, the control section 100 judges that a state is an incomplete lock state. Then, the user interface 8 displays "incomplete lock" indicating that locking of the handlebar 5 is incomplete. In this case, the user interface 8 also displays, for example, a warning message such as "please turn the handlebar", in addition to "incomplete lock".

Then, in a case where the user turns the handlebar 5 so that the pin tip part 31a enters the engagement hole 11c, the control section 100 judges that the state is a lock state. Then, the display of the user interface 8 is switched from "incomplete lock" to "lock" indicating that the handlebar 5 is properly locked.

Figure 18:
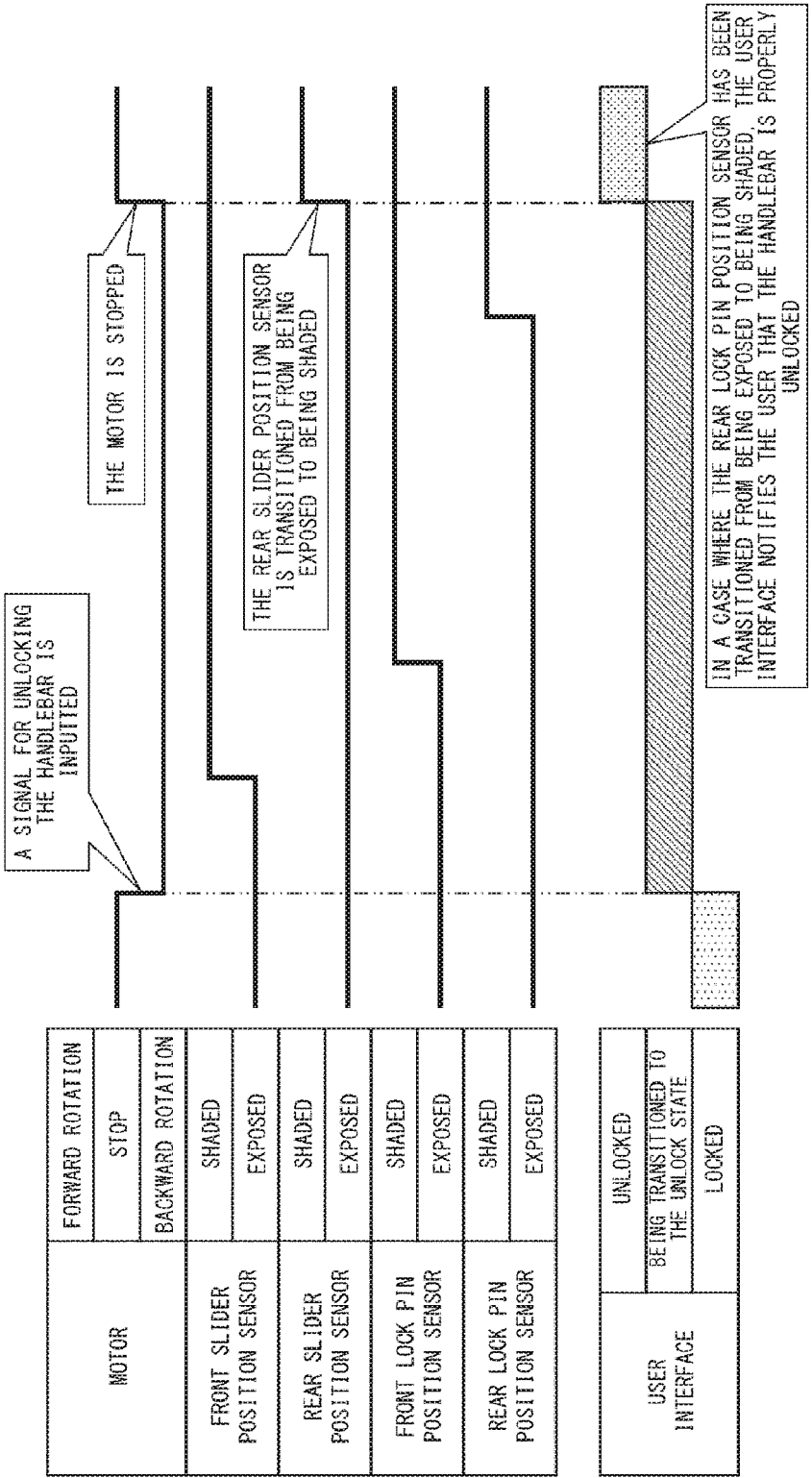
FIG. 18 is a timing chart showing the following in a case where a transition from a lock state (state shown in FIG. 12) to an unlock state (state shown in FIG. 11) is being made by the handlebar locking device in response to an unlock instruction received: (i) a drive signal from the motor, (ii) output signals from the front and rear slider position sensors, (iii) output signals from the front and rear lock pin position sensors, and (iv) a displayed content of the user interface.

FIG. 18 is a timing chart showing the following in a case where a transition from a lock state (state shown in FIG. 12) to an unlock state (state shown in FIG. 11) is being made in response to an unlock instruction received: (i) a drive signal from the motor 51, (ii) output signals from the front and rear slider position sensors S1 and S2, (iii) output signals from the front and rear lock pin position sensors S3 and S4, and (iv) a displayed content of the user interface 8.

As illustrated in FIG. 18, the control section 100 judges that a state is a lock state in a case where (i) the motor 51 has stopped and (ii) all of the output signals from the front and rear slider position sensors S1 and S2 and from the front and rear lock pin position sensors S3 and S4 indicate "exposed". Then the user interface 8 displays "lock".

In this state, in a case where a signal for unlocking the handlebar 5 is inputted, such as an input of an unlock instruction, the control section 100 turns on the motor 51 so as to drive the motor 51 to rotate backwards. This causes the slider 42 to start moving in the direction back to the home position as described above, so that the front slider position sensor S1 and the rear slider position sensor S2, in this order, are transitioned from being exposed to being shaded. The control section 100 turns off the motor 51 with a timing with which the rear slider position sensor S2 is transitioned from being exposed to being shaded.

Since there is no longer a force to push out the holder 36 due to the movement of the slider 42 to the home position, a force of the compressed first spring 33 to be restored causes the lock pin 31 to attempt to return to the home position. In this case, in a case where no force is applied to the handlebar 5 to rotate, the pin tip part 31a is smoothly removed from the engagement hole 11c, so that the front lock pin position sensor S3 and the rear lock pin position sensor S4, in this order, are transitioned from being exposed to being shaded. The control section 100 judges that a state is an unlock state in a case where the rear lock pin position sensor S4 is transitioned from being exposed to being shaded before the rear slider position sensor S2 is transitioned from being exposed to being shaded Then the user interface 8 displays "unlock" informing the user that the handlebar 5 is properly unlocked.

During a period between (i) a time point at which the motor 51 is turned on to drive to rotate backwards and (ii) a time point at which the state is judged as an unlock state, the control section 100 judges that the state is at a midway point of being transitioned to the unlock state. Then, the user interface 8 displays "being transitioned to the unlock state" indicating that the state is at a midway point of being transitioned to the unlock state.

Figure 19:
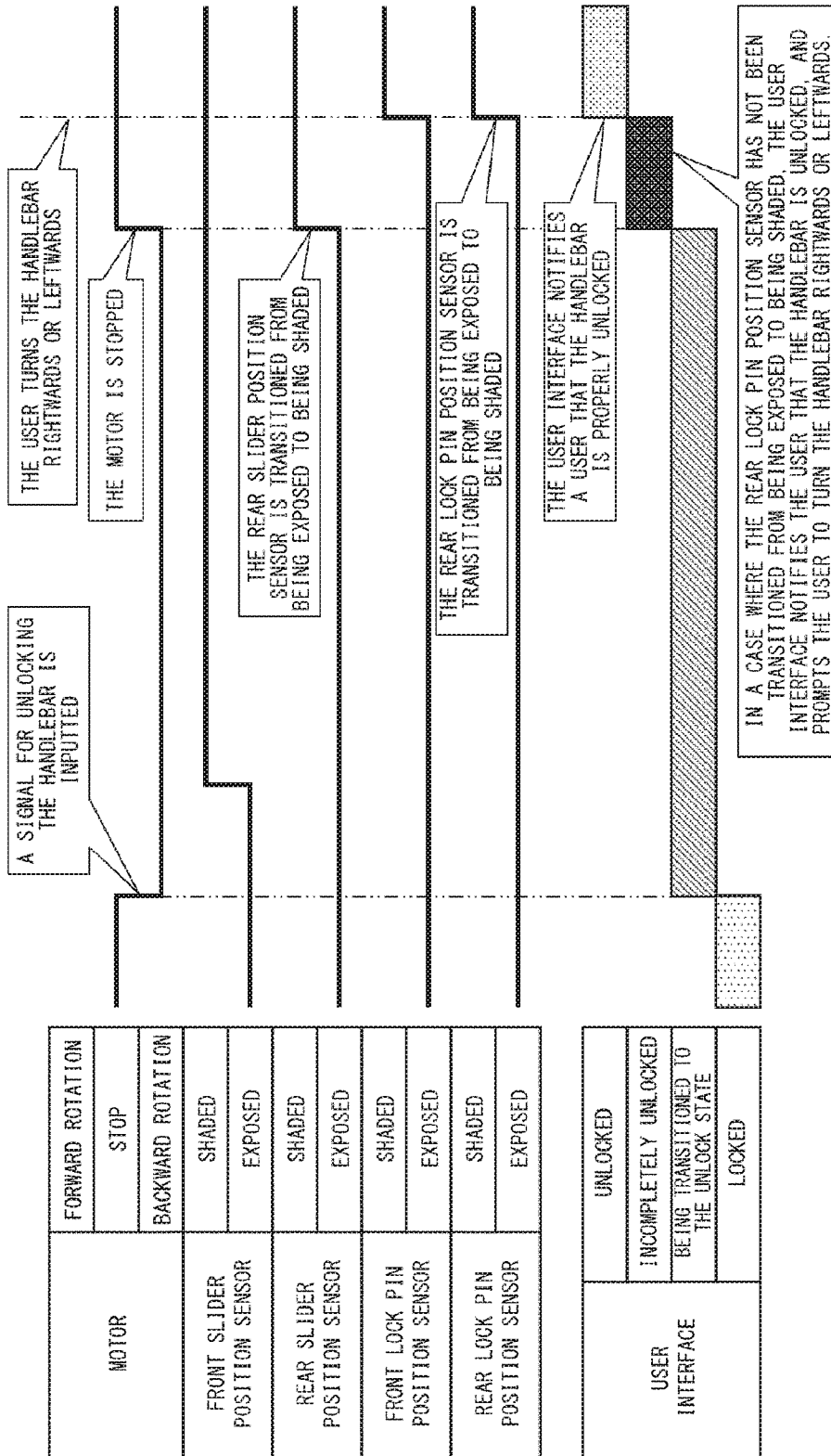
FIG. 19 is a timing chart showing the following in a case where a transition from a lock state (state shown in FIG. 12) to an incomplete unlock state (state shown in FIG. 14) to an unlock state (state shown in FIG. 11) is being made by the handlebar locking device in response to an unlock instruction received: (i) a drive signal from the motor, (ii) output signals from the front and rear slider position sensors, (iii) output signals from the front and rear lock pin position sensors, and (iv) a displayed content of the user interface.

FIG. 19 is a timing chart showing the following in a case where a transition from a lock state (state shown in FIG. 12) to an incomplete unlock state (state shown in FIG. 14) to an unlock state (state shown in FIG. 11) is being made in response to an unlock instruction received: (i) a drive signal from the motor 51, (ii) output signals from the front and rear slider position sensors S1 and S2, (iii) output signals from the front and rear lock pin position sensors S3 and S4, and (iv) a displayed content of the user interface 8.

A comparison with FIG. 17 indicates that if a force is applied to the handlebar 5 to rotate, then the pin tip part 31a is caught on the engagement hole 11c so as not to be removed. This causes the front and rear lock pin position sensors S3 and S4 to each remain exposed even if the rear slider position sensor S2 is transitioned from being exposed to being shaded. In a case where the rear lock pin position sensor remains exposed even though the rear slider position sensor S2 is transitioned from being exposed to being shaded, the control section 100 judges that a state is an incomplete unlock state. Then, the user interface 8 displays "incomplete unlock" indicating that unlocking of the handlebar 5 is incomplete. In this case, the user interface 8 also displays a warning message such as "please turn the handlebar", in addition to "incomplete unlock".

Then, in a case where the user turns the handlebar 5 so that the pin tip part 31a is no longer caught so as to be removed from the engagement hole 11c, the control section 100 judges that the state is an unlock state. This causes the display of the user interface 8 to switch from "incomplete unlock" to "unlock" indicating that the handlebar 5 is properly unlocked.

The control section 100 judges that the state is "error state" as the operation states of the handlebar locking device 20 in a case where, although the control section 100 receives a lock instruction or an unlock instruction via the communication section 101 so as to supply a drive signal to the motor 51, (i) there are no changes in output signals from the front and rear slider position sensors S1 and S2 and/or (ii) an overcurrent of the motor 51 is detected. In a case where an error is detected, the user interface 8 displays a message such as (i) "error" indicating that the error has occurred or (ii) "please carry out maintenance of the handlebar locking device".

In addition, in a case where an error content can be specified, such as the handlebar locking device 20 malfunctioning or the battery running out, the control section 100 transmits the specified error content to the user interface 8. In response, the user interface 8 displays, in addition to "error", a message such as "malfunction of handlebar locking device" or "battery is out" which notifies a user of the error content.

(Examples of Display of User Interface 8)

Figure 20:
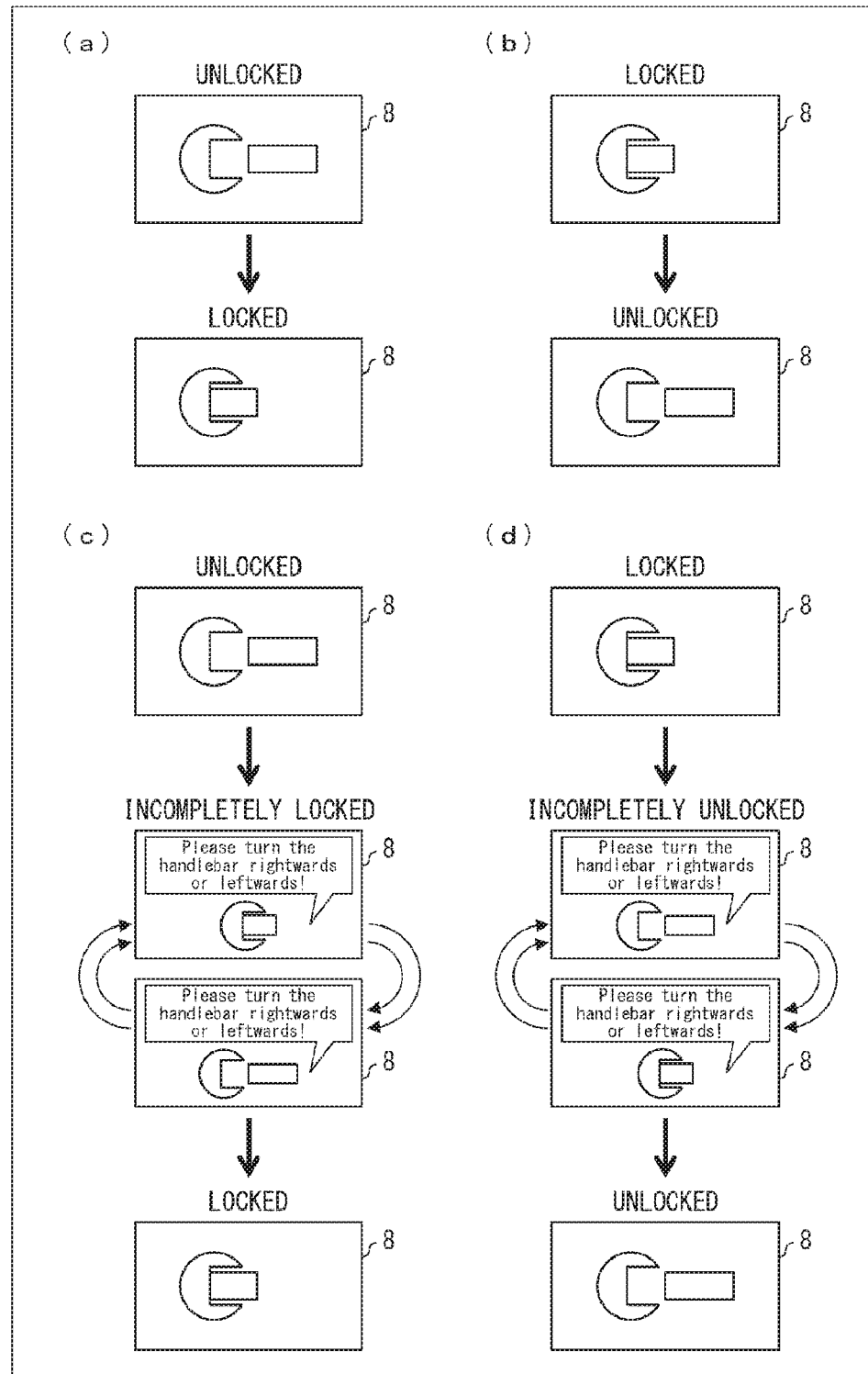
FIG. 20 is a view illustrating display by which the user interface mounted on the bicycle notifies a user of an operation state of the handlebar locking device.

FIG. 20 shows examples of the operation state of the handlebar locking device 20 displayed by the user interface 8. (a) of FIG. 20 shows a case where a lock instruction is supplied during an unlock state, so that locking is properly completed. (b) of FIG. 20 shows a case where an unlock instruction is supplied during a lock state, so that unlocking is properly completed. (c) of FIG. 20 shows a case where a lock instruction is supplied during an unlock state, so that the state is transitioned to an incomplete lock state and then locking is properly completed. (d) of FIG. 20 shows a case where an unlock instruction is supplied during a lock state, so that the state is transitioned to an incomplete unlock state and then unlocking is properly completed.

(a) through (d) of FIG. 20 show a lock state by engaging a recessed keyhole shape and a bar-like key shape with each other, and show an unlock state by disengaging the shapes from each other. (c) and (d) of FIG. 20 show an incomplete lock state and an incomplete unlock state, respectively, by displaying that the engagement and disengagement of the keyhole shape and the bar-like key shape are alternated. In addition, (c) and (d) of FIG. 20 each show that a message "please turn the handlebar rightwards or leftwards" is displayed. Note that the alternation of the engagement and disengagement of the keyhole shape and the bar-like key shape can be displayed also while the state if being transitioned to the lock state or being transitioned to the unlock state.

FIG. 21 shows examples of the operation state of the handlebar locking device 20 displayed by the user interface 8. (a) of FIG. 21 shows an example in which not only a message "error" but also a message "please carry out maintenance of the handlebar locking device" are displayed. (b) of FIG. 21 shows an example in which not only a message "error" but also a message "malfunction of handlebar locking device" are displayed. (c) of FIG. 21 shows an examples in which not only a message "error" but also a message "battery is out" are displayed.

(Variations)

Note that in the present embodiment, the user interface 8 provided on the bicycle 1 is used for (i) transmission of a lock instruction and an unlock instruction and (ii) notification for a user of an operation state of the handlebar locking device 20. However, the present invention is not limited to this configuration. For example, it is alternatively possible that a dedicated application is downloaded to a mobile device, such as a smartphone, of a user of the bicycle 1, so that the mobile device is used for the transmission and the notification. Alternatively, the notification of the operation state of the handlebar locking device 20 can be made not only through displaying but also (i) a sound, a voice, or the like or (ii) a combination of displaying and a sound, a voice, or the like. In a case where the notification is made by a sound, the handlebar locking device 20 can include a sound generating device so that the handlebar locking device 20 itself notifies a user of an operation state of the handlebar locking device 20.

In a case where the handlebar 5 is configured to be lockable, danger is posed by an operation error or the like to cause the handlebar locking device 20 to work while a bicycle is running. Therefore, for the purpose of preventing such a malfunction, a system is set up to determine a running state of a bicycle by, for example, a GPS function, the presence/absence of rotation of the pedals 7, and the status of a kickstand, so that if the bicycle is running, then a lock instruction is ignored. Even in such a case, it is still preferable that a user riding the bicycle can be notified, through a sound, a display, vibration of a mobile device, or the like, that an operation error has occurred.

In the present embodiment, inputting of a lock instruction is used as an example of a signal for locking the handlebar 5, and inputting of an unlock instruction is used as an example of a signal for unlocking the handlebar 5. However, the present invention is not limited to this configuration. For example, it is possible that in a case where several seconds pass while a user of the bicycle 1 is away from the bicycle 1 by several meters or more, the user is prompted to input a signal for locking the handlebar 5. It is alternatively possible that in a case where several seconds passed after a kickstand of the bicycle 1 is put down, the user is prompted to input a signal for locking the handlebar 5. In addition, a user of the bicycle 1 can be prompted to input a signal for unlocking the handlebar 5 in a case where (i) the user entered an area of several meters away from the bicycle 1 and (ii) the kickstand of the bicycle 1 is put up.

Although a two-wheeled bicycle is herein used as an example, the moving body can alternatively be, for example, three-wheeled or four-wheeled. Alternatively, the moving body can be a bicycle which is an electric-assisted bicycle that obtains part of a traveling force from an electric motor that uses a battery as a power source. In such a case, it is possible that an electric power for the handlebar locking device 20 is secured from, instead of the battery 64, a power supply that drives the electric motor. The moving body is not limited to a bicycle.

[Software Implementation Example]

The control section 100 and the control section 8a can each be realized by a logic circuit (hardware) provided in an integrated circuit (IC chip) or the like or can be alternatively realized by software as executed by a central processing unit (CPU).

In the latter case, the control section 100 and the control section 8a each include: a CPU which executes instructions of a program that is software realizing the foregoing functions; a read only memory (ROM) or a storage device (each referred to as a "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communications network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

In order to attain the object, a handlebar lock system in accordance with an aspect of the present invention includes: a handlebar locking device which locks a handlebar of a moving body whose traveling direction is changed by the handlebar; and a state notification device which notifies a user of an operation state of the handlebar locking device, which operation state includes at least a lock state of the handlebar, the handlebar locking device including an operation state identifying section which (i) is provided in an exterior component of the moving body so as to be not viewable from outside of the moving body and (ii) identifies the operation state of the handlebar locking device and a transmitting section which outputs information indicative of the operation state identified by the operation state identifying section, and the state notification device including a receiving section which receives the information indicative of the operation state of the handlebar locking device and a notifying section which notifies, according to the information received by the receiving section, a user of operation information on the handlebar locking device.

According to the configuration, the handlebar locking device is contained and provided in the exterior component of the moving body so as to be not viewable from outside of the moving body. This makes it difficult to unlock a handlebar by a forcible method such as breaking the handlebar locking device. In addition, in a case where, while the handlebar is locked, the handlebar is turned to such an extent that it is difficult for moving body to travel straight, the handlebar locking device can be used as a lock for preventing theft.

However, according to a handlebar locking device which is provided in the exterior component of the moving body so as to be not viewable from outside of the moving body, it is not possible to visually check, from outside of the moving body, whether or not the handlebar is locked. Therefore, checking a lock state requires an operation such as actually moving the handlebar.

Hence, according to the configuration, there is provided the state notification device which notifies a user of the operation state of the handlebar locking device, which operation state includes at least the lock state of the handlebar. The operation state identifying section of the handlebar locking device identifies the operation state of the handlebar locking device, and then the transmitting section outputs information indicative of the operation state thus identified. Then, the receiving section of the state notification device receives the information. According to the information thus received, the notifying section notifies the user of operation information on the handlebar locking device.

Therefore, without carrying out an operation such as actually moving the handlebar, it is possible to check the lock state by use of the state notification device.

The handlebar lock system in accordance with an aspect of the present invention can be further configured so that: the operation state identifying section identifies, as the operation state of the handlebar locking device, an incomplete lock state in which the handlebar is incompletely locked; and in a case where the operation state identifying section has identified the incomplete lock state, the notifying section notifies the user of (i) the incomplete lock state and (ii) information regarding advice for completely locking the handlebar.

According to the configuration, the operation state identifying section of the handlebar locking device identifies the incomplete lock state as the operation state of the handlebar locking device. In a case where the incomplete lock state is identified, the notifying section of the state notification device notifies the user of (i) incomplete lock state and (ii) information regarding advice for completely locking the handlebar.

Therefore, even though the user cannot directly view the handlebar locking device, the user can know when the incomplete lock state occurs. In addition, the user can carry out an operation according to the advice so as to easily make a transition to a complete lock state.

The handlebar lock system in accordance with an aspect of the present invention can be further configured so that: the operation state identifying section identifies, as the operation state of the handlebar locking device, an incomplete unlock state in which the handlebar is incompletely unlocked; and in a case where the operation state identifying section has identified the incomplete unlock state, the notifying section notifies the user of (i) the incomplete unlock state and (ii) information regarding advice for completely unlocking the handlebar.

According to the configuration, the operation state identifying section of the handlebar locking device identifies the incomplete unlock state as the operation state of the handlebar locking device. In a case where the incomplete unlock state is identified, the notifying section of the state notification device notifies the user of (i) incomplete unlock state and (ii) information regarding advice for completely unlocking the handlebar.

Therefore, even though the user cannot directly view the handlebar locking device, the user can know when the incomplete unlock state occurs. In addition, the user can carry out an operation according to the advice so as to easily make a transition to a complete unlock state.

The handlebar lock system in accordance with an aspect of the present invention can be further configured so that: the operation state identifying section identifies, as the operation state of the handlebar locking device, a state in which a battery of the handlebar locking device is out.

According to the configuration, the operation state identifying section of the handlebar locking device identifies, as the operation state of the handlebar locking device, a state in which the battery of the handlebar locking device is out, and then the notifying section of the state notification device notifies the user that the battery is out.

Therefore, in a case where the handlebar locking device runs out of a battery, the user can know so through the state notification device. This allows the user to, for example, promptly replace the battery.

The handlebar lock system in accordance with an aspect of the present invention can be further configured so that: the operation state identifying section identifies, as the operation state of the handlebar locking device, a state in which the handlebar locking device is malfunctioning.

According to the configuration, the operation state identifying section of the handlebar locking device identifies, as the operation state of the handlebar locking device, a state in which the handlebar locking device is malfunctioning, and then the notifying section of the state notification device notifies the user that the handlebar locking device is malfunctioning.

Therefore, in a case where the handlebar locking device is malfunctioning, the user can know so through the state notification device. This allows the user to, for example, promptly deal with the malfunction.

The handlebar lock system in accordance with an aspect of the present invention can be further configured so that: the state notification device serves also as an instruction input section which receives an instruction for the handlebar locking device.

According to the configuration, the state notification device serves also as an instruction input section which receives an instruction for the handlebar locking device. This makes it possible to, with use of only the state notification device, (i) input an instruction for the handlebar locking device and (ii) check the operation state of the handlebar locking device. Therefore, convenience is enhanced.

The present invention also encompasses (i) a program which controls a computer to serve as (a) the operation state identifying section and/or the transmitting section of the handlebar locking device included in the handlebar lock system in accordance with an aspect of the present invention or (b) the receiving section and/or the notifying section of the state notification device included in the handlebar lock system and (ii) a computer-readable storage medium in which the program is stored.

REFERENCE SIGNS LIST

1 Bicycle (moving body)
2 Frame (exterior component)
3 Front wheel
4 Rear wheel
5 Handlebar
8 User interface (state notification device)
8a Control section (receiving section, notifying section)
20 Handlebar locking device
31 Lock pin
60 Control unit
64 Battery 100 Control section (operation state identifying section, transmitting section)
S1 Front slider position sensor
S2 Rear slider position sensor
S3 Front lock pin position sensor
S4 Rear lock pin position sensor

The invention claimed is:

1. A handlebar lock system comprising:
a handlebar locking device which locks a handlebar of a moving body whose traveling direction is changed by the handlebar; and
a state notification device which notifies a user of an operation state of the handlebar locking device, which the operation state includes at least a lock state of the handlebar,
the handlebar locking device including:
an operation state identifying section which (i) is provided in an exterior component of the moving body so as to be not viewable from outside of the moving body and (ii) identifies the operation state of the handlebar locking device by identifying a position of a lock pin and a position of a slider, which the lock pin and the slider are included in the handlebar locking device, and
a transmitting section which outputs information indicative of the operation state identified by the operation state identifying section, and the state notification device including:
a receiving section which receives the information indicative of the operation state of the handlebar locking device, and
a notifying section which notifies, according to the information received by the receiving section, said user of operation information on the handlebar locking device.

2. The handlebar lock system as set forth in claim 1, wherein:
the operation state identifying section identifies, as the operation state of the handlebar locking device, an incomplete lock state in which the handlebar is incompletely locked; and
in a case where the operation state identifying section has identified the incomplete lock state, the notifying section notifies the user of (i) the incomplete lock state and (ii) information regarding advice for completely locking the handlebar.

3. The handlebar lock system as set forth in claim 1, wherein:
the operation state identifying section identifies, as the operation state of the handlebar locking device, an incomplete unlock state in which the handlebar is incompletely unlocked; and
in a case where the operation state identifying section has identified the incomplete unlock state, the notifying section notifies the user of (i) the incomplete unlock state and (ii) information regarding advice for completely unlocking the handlebar.

4. The handlebar lock system as set forth in claim 1, wherein:
the operation state identifying section identifies, as the operation state of the handlebar locking device, a state in which a battery of the handlebar locking device is out.

5. The handlebar lock system as set forth in claim 1, wherein:
the operation state identifying section identifies, as the operation state of the handlebar locking device, a state in which the handlebar locking device is malfunctioning.

6. The handlebar lock system as set forth in claim 1, wherein: the state notification device serves also as an instruction input section which receives an instruction for the handlebar locking device.

7. The handlebar lock system as set forth in claim 1, wherein the operation state identifying section identifies, as the operation state of the handlebar locking device: the lock state, an unlock state, an incomplete lock state, or an incomplete unlock state.

8. A method for locking a handlebar, which method is carried out by a handlebar lock system including: a handlebar locking device which locks a handlebar of a moving body whose traveling direction is changed by the handlebar; and a state notification device which notifies a user of an operation state of the handlebar locking device, which the operation state includes at least a lock state of the handlebar,
the method comprising:
an operation state identifying step of identifying the operation state of the handlebar locking device by identifying a position of a lock pin and a position of a slider, which lock pin and slider are included in the handlebar locking device, the operation state identifying step being carried out by an operation state identifying section which is provided in an exterior component of the moving body so as to be not viewable from outside of the moving body;
a transmitting step of outputting information indicative of the operation state identified in the operation state identifying step;
a receiving step of receiving the information indicative of the operation state of the handlebar locking device; and
a notifying step of notifying, according to the information received in the receiving step, said user of operation information on the handlebar locking device.

* * * * *